(12) United States Patent
Schröder et al.

(10) Patent No.: US 10,132,363 B2
(45) Date of Patent: Nov. 20, 2018

(54) CLUTCH ARRANGEMENT

(71) Applicants: Arthur Schröder, Dittelbrunn (DE);
Jörg Sudau, Niederwerrn (DE); Daniel Pittner, Gerbrunn (DE)

(72) Inventors: Arthur Schröder, Dittelbrunn (DE);
Jörg Sudau, Niederwerrn (DE); Daniel Pittner, Gerbrunn (DE)

(73) Assignee: ZF Friedrichshafen AG, Friedrichshafen (DE)

(*) Notice: Subject to any disclaimer, the term of this patent is extended or adjusted under 35 U.S.C. 154(b) by 237 days.

(21) Appl. No.: 14/376,071

(22) PCT Filed: Jan. 8, 2013

(86) PCT No.: PCT/EP2013/050199
§ 371 (c)(1),
(2) Date: Jul. 31, 2014

(87) PCT Pub. No.: WO2013/113529
PCT Pub. Date: Aug. 8, 2013

(65) Prior Publication Data
US 2015/0008089 A1   Jan. 8, 2015

(30) Foreign Application Priority Data

Feb. 2, 2012 (DE) .................. 10 2012 201 510

(51) Int. Cl.
*F16D 13/40* (2006.01)
*F16D 13/72* (2006.01)
(Continued)

(52) U.S. Cl.
CPC ............. *F16D 13/40* (2013.01); *F16D 13/72* (2013.01); *F16D 13/74* (2013.01); *F16D 25/0638* (2013.01); *F16D 25/123* (2013.01)

(58) Field of Classification Search
CPC .......... F16D 13/40; F16D 13/72; F16D 13/74; F16D 25/0638; F16D 25/123
(Continued)

(56) References Cited

U.S. PATENT DOCUMENTS 1,132,958 A * 3/1915 Miller .................... F16D 13/72
192/107 R
2,434,686 A * 1/1948 Clayton-Wright .......... F16J 15/3204
277/575
(Continued)

FOREIGN PATENT DOCUMENTS

DE         19720575      9/1998
DE         10110897      9/2001
(Continued)

*Primary Examiner* — Huan Le
(74) *Attorney, Agent, or Firm* — Cozen O'Connor

(57) ABSTRACT

A clutch arrangement for a drivetrain of a vehicle comprises a first component, a second component, and a conveying component. The first component has an at least partially disk-shape and has a first friction surface at the disk-shaped portion. The second component has an at least partially disk-shape and has a second friction surface at the disk-shaped portion. The first friction and second friction surfaces are configured and arranged to be brought into a frictional engagement with each other and contact a fluid medium in operation. The conveying component comprises a conveying surface for the fluid medium and coupled to a drive component to be substantially fixed with respect to rotation relative to it such that the conveying surface causes a flow of the fluid medium during a rotation relative to the fluid medium.

10 Claims, 9 Drawing Sheets

(51) Int. Cl.
*F16D 25/0638* (2006.01)
*F16D 25/12* (2006.01)
*F16D 13/74* (2006.01)

(58) Field of Classification Search
USPC .................................. 192/70.12, 3.29, 3.3
See application file for complete search history.

(56) References Cited

U.S. PATENT DOCUMENTS

| | | | |
|---|---|---|---|
| 6,464,059 B1 * | 10/2002 | Kundermann | F16D 21/06 192/106 F |
| 7,017,724 B2 * | 3/2006 | Hayabuchi | F16D 25/0638 192/213.2 |
| 2003/0062235 A1 | 4/2003 | Hick et al. | |
| 2004/0069586 A1 * | 4/2004 | Sasse | F16D 25/123 192/70.12 |
| 2009/0242348 A1 * | 10/2009 | Ishikawa | F16D 25/0638 192/55.61 |
| 2011/0259702 A1 * | 10/2011 | Sudau | F16D 3/14 192/85.23 |
| 2012/0205213 A1 * | 8/2012 | Sudau | F16D 47/06 192/3.33 |
| 2014/0367215 A1 * | 12/2014 | Schroder | F16D 25/12 192/66.31 |
| 2015/0001027 A1 * | 1/2015 | Schroder | F16D 13/38 192/66.3 |

FOREIGN PATENT DOCUMENTS

| | | |
|---|---|---|
| DE | 10109497 | 8/2002 |
| DE | 10 2009 045 610 A1 * | 5/2011 |
| FR | 2291410 | 6/1976 |
| WO | WO02/070913 | 9/2002 |
| WO | WO03/036118 | 5/2003 |

* cited by examiner

CLUTCH ARRANGEMENT

CROSS-REFERENCE TO RELATED APPLICATIONS

This is U.S. national stage of PCT Application No. PCT/EP2013/050199, filed on Jan. 8, 2013, which claims priority to German Patent Application No. DE 10 2012 201 510.8, filed on Feb. 2, 2012, each of which is hereby incorporated herein in its entirety by reference.

FIELD OF INVENTION

The present invention is related to a clutch arrangement such as can be used, for example, in a drivetrain of a vehicle, for example, of a motor vehicle.

DESCRIPTION OF THE RELATED ART

Clutches are used in a wide variety of forms in the vehicle sector, particularly in the motor vehicle sector. They are often utilized within the framework of a drivetrain of a corresponding vehicle for transmitting torque and are used, for example, between a drive unit, i.e., an engine, for example, and a downstream transmission. In this way, it is possible to separate the drivetrain such that the engine can continue to run even when the vehicle is at a standstill, for example. In this case, that is, the clutch separates the rotating engine output shaft from a stationary transmission input shaft.

Clutches can also be used in other configurations in the drivetrain of a vehicle. For example, in the case of hybrid drives, they can also be used between two different drive units or for alternately separating and coupling different drive units in connection with a transmission input shaft. In this regard, clutches can be used in connection with different drive unit technologies, for example, internal combustion engines and electric motors, and in combination with different transmission techniques. For example, they can be used in connection with synchronized as well as non-synchronized transmissions. The transmissions in question can also be manually shifted transmissions or automatic transmissions in which gears can be changed manually, where appropriate, via electric, electronic or other control pulses.

Clutches are often based on producing a frictionally engaging contact between corresponding component parts which are coupled with a drive component and with an output component of the relevant clutch. It is precisely in case of sharply diverging rotational speeds such as can occur, for example, during starting, that energy is converted into heat in the area of the relevant friction surfaces, which can lead to an unwanted heating of the relevant friction surfaces or of the relevant component parts. For this reason, clutches are used in which, for example, oil circulates in the interior of a housing, the heat generated at the friction surfaces being at least partially removed from the friction surfaces by this oil.

The subject matter disclosed in German Patent Application No. DE 10 2009 016 414 A1 is directed to a clutch arrangement in which a corresponding oil flow is built up in a housing of the clutch arrangement. The subject matter disclosed in German Patent Application No. DE 101 25 628 A1 is also directed to a clutch arrangement in which at least one friction member for generating a frictionally engaging connection is formed such that oil circulates around it, the transmission of torque being carried out via the friction members.

A coolant distributing arrangement such is as described, for example, in European Patent Application No. EP 1 813 831 A1 can be used, for example, to increase the flow of a fluid of the type mentioned above. This coolant distributing arrangement has webs or ramps which can be fashioned in different geometries. However, in spatially cramped situations in particular, it may be difficult to implement a corresponding coolant distributing arrangement.

SUMMARY OF THE INVENTION

Therefore, in view of the above, there is a need to find a better compromise between providing a flow of a fluid medium and an installation space requirement in a clutch arrangement. This need is met by a clutch arrangement described by the claimed invention.

According to one embodiment, a clutch arrangement, for example, for a drivetrain of a vehicle, comprises an at least partially disk-shaped first component part having a first friction surface at the disk-shaped portion and an at least partially disk-shaped second component part having a second friction surface at the disk-shaped portion, the first friction surface and second friction surface being configured and arranged such that they can be brought into a frictional engagement with each other and contact a fluid medium in operation. A clutch arrangement further comprises a conveying component which comprises a conveying surface for the fluid medium and which is coupled with a drive component to be substantially fixed with respect to rotation relative to it such that the conveying surface causes a flow of the fluid medium during a rotation relative to the fluid medium. The conveying component engages with the first component part via the conveying surface such that the first component part is set in rotation during a rotation of the conveying component.

Accordingly, some embodiments of a clutch arrangement are based on the insight that a better compromise between producing a flow of the fluid medium and the installation space required for this purpose can be found in that the conveying component used for producing the flow is likewise utilized to transmit torque. To this end, the conveying component engages with the first component part particularly via the conveying surface so that the first component part is also set in rotation by the rotation of the conveying component. Thus it is possible in this way to cause the flow of fluid medium through the same component part, indeed even through the same conveying surface, that is also used for driving the first component part and, therefore, for transmitting torque. Therefore, it can be possible using a clutch arrangement according to one embodiment to produce a greater flow of fluid medium with the installation space requirement remaining the same, to reduce the installation space requirement with the flow of fluid medium maintained constant, or to achieve a compromise between both goals in which the flow of fluid medium is increased and the installation space requirement is reduced.

In the clutch arrangement according to one embodiment, the conveying component engages with the first component part substantially only via the conveying surface. Accordingly, it may be possible where applicable to further improve the above-mentioned compromise because additional driving structures or driven structures can be omitted.

For example, the first component part in a clutch arrangement according to one embodiment can be a plate, i.e., for example, an inner plate or an outer plate, but can also be a different corresponding component part which is used on the output side to transmit torque.

In a clutch arrangement according to one embodiment, the first component part can engage with the conveying component via a driver surface such that a contacting surface between the driver surface and the conveying surface is at most 50% of a surface area of the conveying surface. In this way, it can be possible to adapt the conveying component with the at least one conveying surface to a flow of fluid medium that is as high as possible or is most suited to requirements. In other embodiments, the contacting surface can also be at most 30%, 25%, 20%, 15%, or at most 10% of a surface area of the conveying surface. In this regard, it may be advisable to dimension the contacting surface with respect to a minimum size such that it is greater than a predetermined value to enable a mechanically stable transmission of torque from the conveying component to the first component part via the conveying surface and driver surface. This value may depend on the specific embodiment of the clutch arrangement.

In a clutch arrangement according to one embodiment, the conveying surface can be contiguous and flat. In this way, not only is it possible to simplify the production of the conveying component, since costly geometries of the conveying surface may be avoided, but also, in addition or alternatively, a more deliberate orientation of the flow of fluid medium can be achieved precisely under cramped installation space conditions.

In a clutch arrangement according to one embodiment, the conveying surface can be oriented substantially perpendicular to a tangential direction, this tangential direction being perpendicular to an axis of rotation of the first component part and a radial direction facing away perpendicularly from the axis of rotation. The axis of rotation, which is an axis of rotation in the mathematical sense around which the first component part rotates during a corresponding movement of the conveying component, substantially coincides with an axis of rotation of the second component part and, in many embodiment examples, likewise coincides with an axis of rotation of the drive component. Therefore, the axis of rotation is also referred to as the axis of rotation of the clutch arrangement.

Due to the fact that the conveying surface of the conveying component is oriented substantially perpendicular to the tangential direction, it may be possible to reduce an axial load on the first component part and further components connected to the latter because substantially no axial force components are transmitted due to the orientation of the corresponding conveying surface perpendicular to the tangential direction. Correspondingly, the driver surface of the first component part can also be oriented substantially perpendicular to the tangential direction. However, it may also be possible where appropriate to advantageously influence the existing flow of fluid medium in the clutch arrangement through a corresponding orientation of the conveying surface. For example, it may be possible optionally in connection with further components of the clutch arrangement to achieve a flow of fluid medium proceeding substantially radially outward starting from the conveying surfaces through the corresponding orientation of the conveying surfaces.

In a clutch arrangement according to one embodiment, the conveying component can have a plurality of conveying surfaces which are arranged to be distributed along a circumference of the conveying component. In this way, it may be possible to increase a force transmission or torque transmission to the first component part because the corresponding forces are distributed to a correspondingly greater quantity of conveying surfaces.

In a clutch arrangement according to one embodiment, the conveying component can be formed substantially annularly. It may be possible in this way to facilitate a production of the conveying component. In addition or alternatively, however, an installation space for the conveying component can also be reduced correspondingly.

In a clutch arrangement of this type, the conveying component can be formed in one piece. Alternatively, the conveying component can also comprise a plurality of ring-segment-shaped conveying component segments, each ring-segment-shaped conveying component segment being formed in one piece. In this connection, the conveying component segments of the plurality of conveying component segments can be substantially identical but may also deviate from one another. The one-piece construction of the conveying component can make it possible to avoid a costly production process in which a plurality of components of the conveying component may have to be connected by producing a positive, bonding and/or frictional connection between them. This likewise applies to the conveying component segments which allow a simplified assembly and/or production of the conveying component within the framework of the clutch arrangement. In contrast, the one-piece configuration of the conveying component can also make it possible to simplify the overall production of the clutch arrangement due to a fewer number of parts and/or less labor for manufacture. By "one-piece component" is meant herein a component that is fashioned from exactly one contiguous piece of material. Therefore, "one-piece" can be used synonymously with the expressions "integral" or "of one part".

In this regard, a frictionally engaging connection is brought about by static friction, a bonding connection is brought about by molecular or atomic interactions and forces, and a positively engaging connection is brought about by geometric connection of the relevant mating parts. Accordingly, the static friction generally presupposes a normal force component between the two mating parts.

In a clutch arrangement of this kind according to one embodiment, the conveying component or ring-segment-shaped conveying component segments can be produced by deforming a sheet-like workpiece, by a cutting production method or by a casting production method. Accordingly, particularly when the conveying component or conveying component segment is produced by deforming a sheet-like workpiece, it is possible to realize a production method which is inexpensive and simple but which has a corresponding stability for many fields of application. However, for more demanding applications, for example, it may be advisable to use more elaborate production methods, namely, a cutting production method or casting production method, to produce the conveying component or conveying component segments.

In a clutch arrangement according to one embodiment, the drive component can be a housing which can be filled, or is filled, with the fluid medium. The conveying component can then be connected to the housing by a substantially positively engaging connection to bring about the substantially rotationally fixed coupling of the conveying component to the drive component. This makes it possible to realize a particularly compact mode of construction of a corresponding clutch arrangement in which the housing of the clutch arrangement is used directly as drive component.

In a clutch arrangement of this kind according to one embodiment, the conveying component can be connected to the housing to be fixed with respect to rotation relative to it by a rivet connection and/or plug-in connection. A comparatively simple but mechanically stable positively engaging and rotationally fixed connection of the conveying component to the housing can be brought about in this way. Accordingly, it may also be possible in this way to enable the required transmission of even higher torques from the housing to the conveying component and further to the first component part by means/device/apparatus constructed in a comparatively simple manner.

A clutch arrangement according to an embodiment example in which the drive component is a housing which can be filled, or is filled, with fluid medium can further have a pressing element which is configured and arranged such that when actuated it brings the first friction surface and second friction surface into frictional engagement with each other and/or severs the frictional engagement. The conveying component can be connected to the pressing element to be fixed with respect to rotation relative to it, for example, by a rivet connection and/or a plug-in connection, and the housing is connected to a connection component to be fixed with respect to rotation relative to it, for example, by a rivet connection and/or plug-in connection.

Further, the connection component can be connected to the conveying component to be substantially fixed with respect to rotation relative to it, for example, using a rivet connection and/or a plug-in connection. Accordingly, in a clutch arrangement of this kind according to an embodiment example, the conveying component can be directly connected to the pressing element, while the conveying component is connected via the connection component to the housing serving as drive component. Accordingly, the pressing element is compelled to rotate via the connection component and the conveying component when the housing rotates. Correspondingly, the pressing element is decelerated along with a corresponding slowing down of the drive component. Accordingly, a free rotation of the pressing element is reduced or eliminated in certain operating situations of the clutch arrangement, i.e., in certain driving situations of a corresponding vehicle. In this way, it may be possible where applicable to reduce or even prevent an unintentional noise generating from the clutch arrangement.

In a clutch arrangement of this type according to an embodiment example, the connection component can have a plurality of leaf spring elements which are connected by positive engagement, for example, by a rivet connection and/or a plug-in connection, to the conveying component to produce a substantially rotationally fixed connection between the conveying component and the connection component. The use of corresponding leaf spring elements can make possible a substantially rotationally fixed connection, but at the same time can allow a movement of the pressing element and, therefore, of the conveying element along the axis of rotation, also referred to as axial direction.

Accordingly, at least a substantially rotationally fixed connection is produced due to deformations of the leaf spring elements which may occur through the action of torque and/or through an axial displacement of the connection component along the axis of rotation. For example, a slight rotation of the correspondingly connected components relative to one another may be brought about by the aforementioned effects. Further, the use of leaf spring elements can facilitate production and/or can also make it possible to implement a more lightweight connection component.

In a clutch arrangement according to an embodiment example in which the drive component is the housing, the first component part can comprise a disk-shaped component part with a central recess, wherein the friction surface is arranged at a main surface of the disk-shaped component part oriented substantially perpendicular to the axis of rotation. Engagement with the conveying component can take place at a lateral surface of a portion of the disk-shaped component part projecting into the central recess, and the second component part comprises an additional disk-shaped component part with a central recess, this further disk-shaped component part engaging at an outer radius thereof with a support. Therefore, the first component part can be an inner plate and the second component part can be an outer plate. Accordingly, the second component part can have an additional driver surface at a lateral surface of a portion of the further disk-shaped component part remote of the central recess, the second component part engaging with the support via this further driver surface. Correspondingly, the support can likewise have a corresponding driver surface. A clutch arrangement of this type enables a very compact construction in particular.

A clutch arrangement of this type according to one embodiment can further have a pressing element which is configured and arranged to bring the first friction surface and second friction surface into frictional engagement with each other and/or to sever the frictional engagement when actuated, wherein the pressing element at least partially limits a first volume which is filled with fluid medium and which comprises in a cross-sectional plane in which the axis of rotation extends a cross-sectional area corresponding to at most twenty times the cross-sectional area of the conveying surface in the cross-sectional plane.

Accordingly, in a clutch arrangement of this type according to one embodiment, the conveying surface travels through the first volume to a significant extent during a rotation and accordingly leads to the described flow of fluid medium in the first volume. In this way, a significant flow of fluid medium serving, for example, to cool or transport heat from the friction surfaces can be supplied particularly in the first volume using the conveying surface. In other embodiments, the cross-sectional area of the first volume in the cross-sectional plane can also correspond to at most 15 times, at most 10 times, at most 7.5 times, at most 5 times, at most 3 times, or at most 2 times the conveying surface.

In a clutch arrangement of this type according to one embodiment, the pressing element can have a passage into the first volume for the fluid medium which is arranged along radial direction on the level of the conveying surface or closer to the axis of rotation. Fluid medium can flow through the first component part and/or second component part and the support in an operating condition in which frictional engagement is present so that during a rotation of the conveying surface relative to the fluid medium a flow of fluid medium radially outward through or along the first friction surface and/or second friction surface is brought about by the conveying surface. In one embodiment of this kind, the first volume can be limited substantially by the housing, the first component part, second component part and pressing element. The connection component or another corresponding component part can also further limit the first volume. This can include a sealing element in particular.

In principle, the fluid medium can be any liquid that is suitable for carrying off an amount of heat occurring in a slip condition at the friction surfaces. For example, the fluid medium can be oil which is supplied via an external fluid supply of the clutch arrangement.

The clutch arrangement according to one embodiment can be, for example, a single-disk clutch, a two-disk clutch or—generally speaking—a multidisk clutch. For example, it can be a starting clutch in connection with a non-synchronized transmission (e.g., automatic transmission) or a separating clutch in connection with a synchronized transmission.

BRIEF DESCRIPTION OF THE DRAWINGS

Embodiments will be described and explained more fully in the following referring to the accompanying drawings, in which.

Identical or comparable components are denoted by identical reference numerals in the following description of the accompanying drawings.

Figure 1:
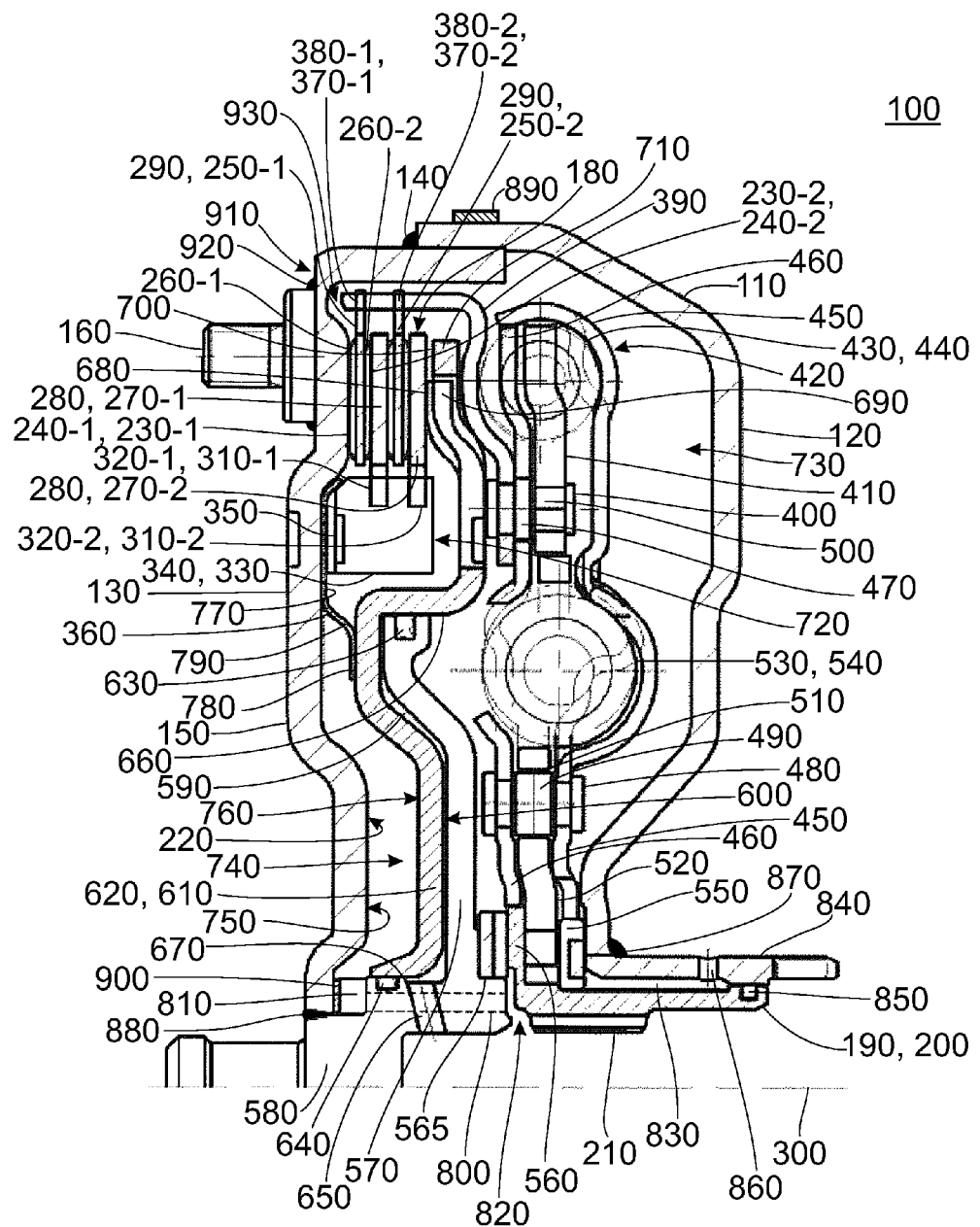
FIG. 1 shows a cross-sectional view through a clutch arrangement according to one embodiment.

Further, collective reference numerals are used for components and objects which occur more than once in one embodiment or diagram but which are described collectively with respect to one or more features.

Components or objects which are denoted by identical reference numerals or collective reference numerals may be constructed identically or possibly also differently with respect to one or more or all features, for example, their dimensions, unless otherwise explicit or implicit from the description.

DETAILED DESCRIPTION OF THE PRESENTLY PREFERRED EMBODIMENTS

FIG. 1 shows a cross section through a clutch arrangement 100 according to one embodiment. The clutch arrangement 100 can be used, for example, in a drivetrain of a vehicle, for example, to convey a torque supplied by a drive unit to a transmission or to another component in a separable manner. Therefore, the clutch arrangement 100 can be used, for example, as a separating clutch when combined with a synchronized transmission or as a starting clutch in combination with a non-synchronized transmission, for example, a corresponding automatic transmission.

Clutch arrangement 100 comprises a housing 110 which is constructed in the present instance as a two-part housing with a first housing shell 120 and a second housing shell 130. The second housing shell 130 is also referred to as engine-side cover of clutch arrangement 100. The two housing shells 120, 130 are connected to each other via a weld connection 140. Housing 110 can accordingly be filled, or is filled, with a fluid medium, for example, an oil or other liquid which is suitable for absorbing and carrying off heat occurring in the interior of housing 110.

In the clutch arrangement 100 shown in FIG. 1, second housing shell 130 and, therefore, housing 110 serve as drive component 150. To this end, second housing shell 130 has a weld bolt 160 for fastening to a flexplate or to a flywheel of a drive unit, for example, of an engine, or to another component of the drivetrain. Alternatively, a stud or other fastening structure for fastening the clutch arrangement 100 can be implemented instead of the weld bolt 160.

Specifically, the clutch arrangement 100 shown in FIG. 1 is a multidisk clutch or multiplate clutch. Correspondingly, clutch arrangement 100 has in an interior space of the housing 110 a friction pack 180 having a plurality of first friction surfaces 230 and second friction surfaces 240. The first friction surfaces are coupled with the drive component 150 or housing 110 to be at least substantially fixed with respect to rotation relative to it via components which will be described in the following, and the second friction surfaces 240 are coupled with an output component 190 of the clutch arrangement to be at least substantially fixed with respect to rotation relative to it. Specifically, output component 190 is a lower hub 200 which can be coupled by positive engagement with a transmission input shaft, not shown in FIG. 1, via an internal toothing 210. The transmission input shaft has an external toothing corresponding to internal toothing 210.

In the embodiment of a clutch arrangement 100 shown in FIG. 1, friction pack 180 comprises a first friction surface 230-1 which is formed at an inner surface 220 of housing 110 or of second housing shell 130 and which is in frictional engagement, or can be brought into frictional engagement, with a corresponding second friction surface 240-1 of an outer plate 250-1. Outer plate 250 is lined with a friction facing 260-1 at which second friction surface 240-1 is formed. In contrast, first friction surface 230-1 is formed directly at the inner surface 220 of housing 110, i.e., for example, as a steel surface, when housing 110 is also fashioned from steel.

Outer plate 250-1 has at a side remote of inner surface 220 an additional friction facing 260-2 which forms an additional second friction surface 240-2 at an upper surface. Second friction surface 240-2 is in frictional engagement with an inner plate 270-1, or can be brought into frictional engagement with the latter, via a corresponding first friction surface 230-2.

Further, friction pack 180 has an additional outer plate 250-2 and an additional inner plate 270-2. Outer plate 250-2 also has corresponding friction facings 260 which, like the first and second friction surfaces 230, 240, are not provided with reference numerals in FIG. 1 for the sake of clarity. Outer plate 250-2 is arranged between the two inner plates 270-1 and 270-2. Friction pack 180 is accordingly limited by inner plate 270-2 at a side remote of inner surface 220 of housing 110.

Inner plates 270 are implemented as substantially disk-shaped steel component parts and form corresponding at least partially disk-shaped first component parts 280 at which first friction surfaces 230 are arranged in the region of the disk-shaped portions. The outer plates 250 are also implemented using the friction facings 260 thereof as at least partially disk-shaped second component parts 290 having second friction surfaces 240 at the disk-shaped portions thereof. Friction facings 260 can also be provided at the other respective components in other embodiments.

Inner plates 270 and outer plates 250 have in each instance a central recess with respect to an axis of rotation 300, inner plates 270 and outer plates 250 being arranged to be rotatable exactly around axis of rotation 300. Therefore, axis of rotation 300 also represents the axis of rotation of the clutch arrangement 100 in a mathematical sense and is also referred to as axial direction.

To allow torque to be transmitted from the housing 110 serving as drive component 150 to the inner plates 270, inner plates 270 have in each instance a portion 310-1, 310-2 at which a driver surface 320-1, 320-2 is formed at a lateral face, inner plates 270 engaging in each instance with a conveying surface 330 of a conveying component 340 via these driver surfaces 320-1, 320-2 such that, when conveying component 340 rotates, the respective inner plates 270 (first component parts 280) are also set in rotation. Conveying component 340 is substantially annularly shaped and extends around axis of rotation 300 along a circumference of clutch arrangement 100. In the embodiment shown in FIG. 1, conveying component 340 is substantially meander-shaped such that conveying surfaces 330 run substantially perpendicular to a circumferential direction of clutch arrangement 100, i.e., substantially perpendicular to a tangential direction, this tangential direction being perpendicular to axis of rotation 300 and to a radial direction facing away from axis of rotation 300 in the corresponding cross-sectional plane.

Specifically, conveying component 340 has a plurality of conveying surfaces 330. These conveying surfaces 330 are evenly arranged, for example, along the circumference of conveying component 340. Correspondingly, portions 310 of inner plate 270 also have a corresponding quantity of driver surfaces 320 with which the plurality of conveying surfaces 330 engage. Conveying component 340 and portions 310 of inner plates 270 accordingly form teeth which mesh with one another. In this way, the torque to be transmitted can be distributed to a greater quantity of conveying surfaces 330 and driver surfaces 320 such that it may be possible where applicable to transmit a correspondingly higher torque to inner plates 270 and, therefore, through clutch arrangement 100 according to one embodiment.

However, before specific implementations of a corresponding conveying component 340 are shown and described in more detail with reference to FIGS. 2 and 3, the clutch arrangement 100 according to one embodiment will be described first.

Conveying component 340 is connected to a sealing element 360 and second housing shell 130 to be fixed with respect to rotation relative to the latter and in a positively engaging manner via a rivet connection 350. Accordingly, via rivet connection 350 and, as the case may be, via sealing element 360, a rotational movement of drive component 150, i.e., housing 110, is transmitted to conveying component 340 and, therefore, to conveying surfaces 330. Torque is accordingly transmitted to inner plates 270 using the engagement of inner plates 270 with conveying component 340 via conveying surfaces 330 and driver surfaces 320.

Outer plates 250 (second component parts 290) also have portions 370-1 and 370-2 which engage via corresponding further driver surfaces 380 with a support 390, also referred to as outer plate support, and in case a frictional engagement is provided, receive the torque transmitted from inner plates 270 to outer plates 250.

Support 390 has a substantially pot-shaped structure with a central recess and is coupled with a first hub disk 410 of a two-stage vibration damper 420 via a rivet connection 400. First hub disk 410 is coupled with support 390 via a spacer 500. Spacer 500 is formed as part of rivet connection 400 but can also be formed separately from the latter.

Vibration damper 420 has a plurality of first spring elements 430 which are arranged along a circumference of first hub disk 410 and contact the latter by one end in each instance. First spring elements 430 are implemented as helical springs 440. The helical springs 440 or first spring elements 430 contact a first cover plate 450, also designated as right-hand cover plate based on the arrangement shown in FIG. 1, by the other respective end. First cover plate 450 is connected to a second cover plate 460, also designated as left-hand cover plate, via a spacer 490. Together, the latter form an unclosed housing for the damper element 430. The second cover plate 460 leads radially inward in one piece.

Rivet connection 400 and spacer 500 by which support 390 is connected to first hub disk 410 of vibration damper 420 is guided through ring-segment-shaped elongated hole 470 which defines a maximum movement amplitude of the two cover plates 450, 460 relative to first hub disk 410 and, therefore, to support 390.

Second cover plate 460 extends in radial direction appreciably farther than first cover plate 450 extends in direction toward axis of rotation 300. Accordingly, first cover plate 450 is mechanically connected via an additional rivet connection 480 and spacer 490 to second cover plate 460 to be fixed with respect to rotation relative to it. Spacer 490 extends through an elongated hole 510, which is also shaped like a ring segment, into a second hub disk 520. Second hub disk 520 and first cover plate 450 are coupled with each other via second spring elements 530 which are also implemented again in this case as helical springs 540. Second cover plate 460 accordingly leads in one piece radially inward via the second spring set with second spring elements 530.

In other embodiments of a clutch arrangement 100 other spring elements can also be used as first spring elements 430 and second spring elements 530. For example, barrel springs or elastomer-based spring elements can also be used insofar as suited to technical constraints, i.e., particularly the chemical and/or thermal constraints existing in housing 110.

Second hub disk 520 is further connected to the lower hub 200, i.e., to output component 190, to be fixed with respect to rotation relative to it. In this case also, a rivet connection can be used, for example. However, other connection techniques, for example, positively engaging, frictionally engaging and/or bonding connection techniques, can also be used. For example, second hub disk 520 and lower hub 200 can be welded together. In addition or alternatively, however, plug-in connections can also be implemented. Accordingly also instead of the other rivet connections described above, they can be realized additionally or alternatively as plug-in connections or using other connection techniques.

The torque is transmitted from outer plates 250 via support 390 and first hub disk 410 via spring elements 430 to cover plates 450, 460. From the latter it is further conveyed via second spring elements 530, via second hub disk 520 and lower hub 200 to the transmission input shaft, not shown in FIG. 1, when the first friction surfaces 230 and second friction surfaces 240 engage with each other.

In the embodiment shown in FIG. 1, second hub disk 520 is supported opposite first housing shell 120 to be rotatable with respect to axis of rotation 300 using a bearing 550, specifically in the present case using an axial friction bearing. At the side of second hub disk 520 remote of bearing 550, second hub disk 520 is supported against a portion 560 of lower hub 200 which is in turn supported via an additional bearing 565 to be rotatable around axis of rotation 300 with respect to a dividing wall 570. The further bearing 565 is also an axial friction bearing in the embodiment shown in FIG. 1.

Dividing wall 570 is part of a front hub 580 and defines a piston pressure space 590 at least on one side. This piston pressure space 590 is limited along axial direction, i.e., along axis of rotation 300, by a piston face 600 of a piston 610. As will be shown in the further description, piston 610 forms a pressing element 620 which is configured and arranged to bring first friction surfaces 230 and second friction surfaces 240 into frictional engagement with each other upon actuation. In other embodiments, pressing element 620 can also be configured to sever the frictional engagement. However, as will also be illustrated in more detail in the following description, the clutch arrangement shown in FIG. 1 is a normally open clutch in which there is no frictional engagement or only a slight frictional engagement in pressureless condition, i.e., in the absence of actuation.

In the embodiment shown here, pressing element 620 is configured to bring first friction surfaces 230 and second friction surfaces 240 into frictional engagement with each other upon actuation.

Piston pressure space 590 is sealed using two sealing elements 630 and 640 relative to pressing element 620 on the one hand and front hub 580 on the other hand. In order to fill the piston pressure space with a corresponding pressurized medium which can be, for example, the same fluid medium with which the rest of housing 110 can also be filled, front hub 580 has an inlet bore 650 to piston pressure space 590 which fluidically joins piston pressure space 590 with a region of the central recess which faces second housing shell 130 and in which the transmission input shaft is also arranged.

To allow a movement of pressing element 620 along rotational direction 300, the two sealing elements 630, 640 are arranged in each instance in a corresponding groove in dividing wall 570 and front hub 580 and are oriented such that they contact a corresponding sealing surface 660 and 670 of pressing element 620 extending along rotational direction 300.

Pressing element 620 extends along radial direction, i.e., proceeding from axis of rotation 300, perpendicular to the latter to the level of inner plates 270 and outer plates 250. Pressing element 620 has in this region a first pressing surface 680 which faces first friction surfaces 230 and second friction surfaces 240, i.e., outer plates 250 and inner plates 270.

In the embodiment shown in FIG. 1, first pressing surface 680 is formed by a cropping of pressing element 620 by which a nose 690 is formed, this nose 690 presenting toward first friction surfaces 230 and second friction surfaces 240 opposite the pressing element 620 in this region. Accordingly, nose 690 is connected to pressing element 620 via a piece of material from which pressing element 620 is fashioned, i.e., for example, a steel or other metal material, and therefore has a smaller spring constant compared to pressing element 620. The clutch arrangement 100 shown in FIG. 1 has a plurality of noses 690 which are arranged to be distributed along the circumference of the clutch arrangement. The arrangement can be uniform or irregular.

Nose 690 contacts a back side of inner plate 270-2 via first pressing surface 680. Pressing element 620 is accordingly formed using nose 690 to generate a pressing force in direction of first friction surfaces 230 and second friction surfaces 240 via first pressing surface 680 of pressing element 620, by which pressing force the frictional engagement can be produced therebetween. Because of the decreased spring constant compared to the rest of pressing element 620, a softer engagement can be possible, if required, by providing first pressing surface 680 at nose 690.

Beyond this, however, pressing element 620 further has a second pressing surface 700 which is formed at a portion 710 of pressing element 620 rather than at nose 690. With respect to its spring characteristics, i.e., for example, its spring constants, portion 710 differs appreciably less from the other regions of pressing element 620 than is the case with nose 690, for example. The spring constant of portion 710 is typically appreciably greater than that of nose 690, i.e., for example, at least two times, at least five times or at least ten times greater.

If pressing element 620 is now moved along axis of rotation 300 to first friction surfaces 230 and second friction surfaces 240, that is, moved to the left referring to FIG. 1, a comparatively soft engagement is initially carried out via first pressing surface 680 of noses 690. If pressing element 620 is moved farther, the deformation of nose 690 increases and the pressing force exerted via first pressing surface 680 on plates 250, 270 and, therefore, on the corresponding friction surfaces 230, 240 is greater. If pressing element 620 is moved sufficiently far to cause the pressing force via second pressing surface 700 of portion 710, an appreciably higher, virtually surging pressing force is possibly transmitted to friction surfaces 230, 240.

Apart from elastic deformations of pressing element 620 and possibly of friction facings 260, pressing element 620 is now in an end condition in which clutch arrangement 100 is completely engaged. A further increase is also still possible in this region through a corresponding increase in a force driving pressing element 620 in direction of first friction surfaces 230 and second friction surfaces 240 but without significant movement of pressing element 620.

While first pressing surface 680 generally continues to remain in contact with inner plate 270-2 in the above-described transition from first pressing surface 680 to second pressing surface 700, it transmits substantially smaller forces compared to second pressing surface 700, these forces resulting from the ratio of the corresponding spring constants of nose 690 and of that of portion 710. In this condition, pressing element 620 substantially contacts inner plate 270-2 along the entire circumference of pressing element 620.

To prevent an effective pressing point from shifting during an engagement of clutch arrangement 100, surface center points or effective contact points of the relevant two pressing surfaces 680, 700 can substantially coincide in the embodiment of the pressing element 620 shown in FIG. 1 taking into account the corresponding counterpart component, i.e., in the present instance taking into account inner plate 270-2. Further, in the implementation of pressing element 620 shown in FIG. 1, a pressing surface can be increased. In this way it may be possible where applicable to transmit a greater pressing force because of the higher surface substantially without the risk of changing the effective pressing point.

A shifting of the effective pressing point could lead to a change in the existing pressure ratios at the first friction surfaces 230 and second friction surfaces 240, which pressure ratios can be brought about, for example, by an elasticity of friction facings 260 or of the relevant inner plates 270 and outer plates 250 and other component parts. Accordingly, a point on the friction surfaces 230, 240 at which a maximum heat can be transmitted because of the friction occurring during engagement can be displaced. Thus it may happen under certain circumstances that a cooling of the first friction surfaces 230 and second friction surfaces 240 through the aforementioned fluid medium in the interior of housing 110 is less efficient.

Also, an irregular wear of friction facings 260 may be brought about. Further, due to the axial movability of inner plates 270 and outer plates 250, it can also happen under certain circumstances that a slight tilting of the plates 250, 270 comes about in the region of their respective teeth or meshing engagements with conveying component 340 and support 390 so that the corresponding effect may be further reinforced.

Pressing element 620, outer plates 250, inner plates 270 and sealing element 360 at least partially limit a first volume 720 of an inner volume of clutch arrangement 100. As has already been mentioned briefly in connection with conveying component 340, conveying component 340 has the plurality of conveying surfaces 330 which do not only engage with the driver surfaces 320 of the inner plates 270; on the contrary, conveying surfaces 330 are also formed to cause a flow of the fluid medium in the interior of housing 110 when the conveying surfaces move relative to the fluid medium. To this end, conveying component 340 is connected to housing 110 serving as drive component 150 to be fixed with respect to rotation relative to it. In the embodiment shown in FIG. 1, conveying surfaces 330 are arranged not least in first volume 720 so that the fluid medium located in this first volume 720 is conveyed during a movement of conveying surfaces 330 relative to the fluid medium.

To allow the fluid medium to be conveyed as efficiently as possible, it may be advisable in this connection to allow the inner plates 270 to engage with conveying surfaces 330 of conveying component 340 via driver surfaces 320 such that a contacting surface between the relevant driver surfaces 320 and conveying surface 330 is at most 50% of a surface area of the conveying surface. Given a sufficient stability and force transmission or torque transmission to driver surfaces 320 of inner plates 270 via conveying surfaces 330, a further reduction in relation to the above-mentioned ratio may lead to an improved flow. It may be advisable in other embodiments, for example, to limit the above-mentioned ratio to at most 30%, at most 25%, at most 20%, at most 15%, or at most 10%. A lower limit for this ratio must be sought in the dual function of the conveying surface area on the one hand and the engagement surface area on the other hand.

As is shown in FIG. 1, conveying surfaces 330 are contiguous and flat. They are oriented along the circumferential direction or tangential direction, i.e., substantially perpendicular to axis of rotation 300 and radial direction facing away from the latter. This configuration can be advantageous as regards the torque-transmitting characteristics of conveying surfaces 330 because, in this way, axial forces along axis of rotation 300 can be reduced or even prevented via driver surfaces 320 on inner plates 270 (first component parts 280). But this configuration of conveying surfaces 330 can also be advantageous with respect to causing the flow of the fluid medium, i.e., for example, of an oil. For example, it may be possible in this way to cause a substantially radially outwardly directed flow of the fluid medium to first friction surfaces 230 and second friction surfaces 240.

The relevant plates 270, 250 or friction facings 260 which may be realized thereon can be formed in such a way that the flow of fluid medium can flow through them. To this end, the corresponding plates 250, 270 or the components communicating therewith can have channels or fluid channels which allow the fluid medium to flow through along radial direction. These channels or fluid channels can be formed in a straight line, for example, but can also be formed in curved lines and can run in the region of friction surfaces 230, 240. Accordingly, friction energy or heat released precisely in the region of the friction surfaces 230, 240 can be discharged in close proximity to the fluid medium and carried away because of the existing flow.

In the cross-sectional plane shown in FIG. 1, conveying surface 330 has a cross-sectional surface which in turn comprises a significant proportion of a cross-sectional surface of second volume 740 in the relevant cross-sectional plane. In order to enable a conveying action of conveying component 340 which is as high as possible but is suited to circumstances, it may be advisable in embodiments of a clutch arrangement 100 to select the cross-sectional surface of first volume 720 in relation to the cross-sectional surface of conveying surface 330 such that it corresponds to at most 20 times, at most 15 times, at most 10 times, or at most 7.5 times the cross-sectional surface of conveying surface 330.

It may be possible to use even smaller factors in embodiments of a clutch arrangement. Indeed it is also possible to provide at most 5 times, at most 3 times, or at most 2 times more conveying surface 330 than cross-sectional surface of first volume 720. Larger multiples than those mentioned above can also occur in other embodiments.

Figure 7:
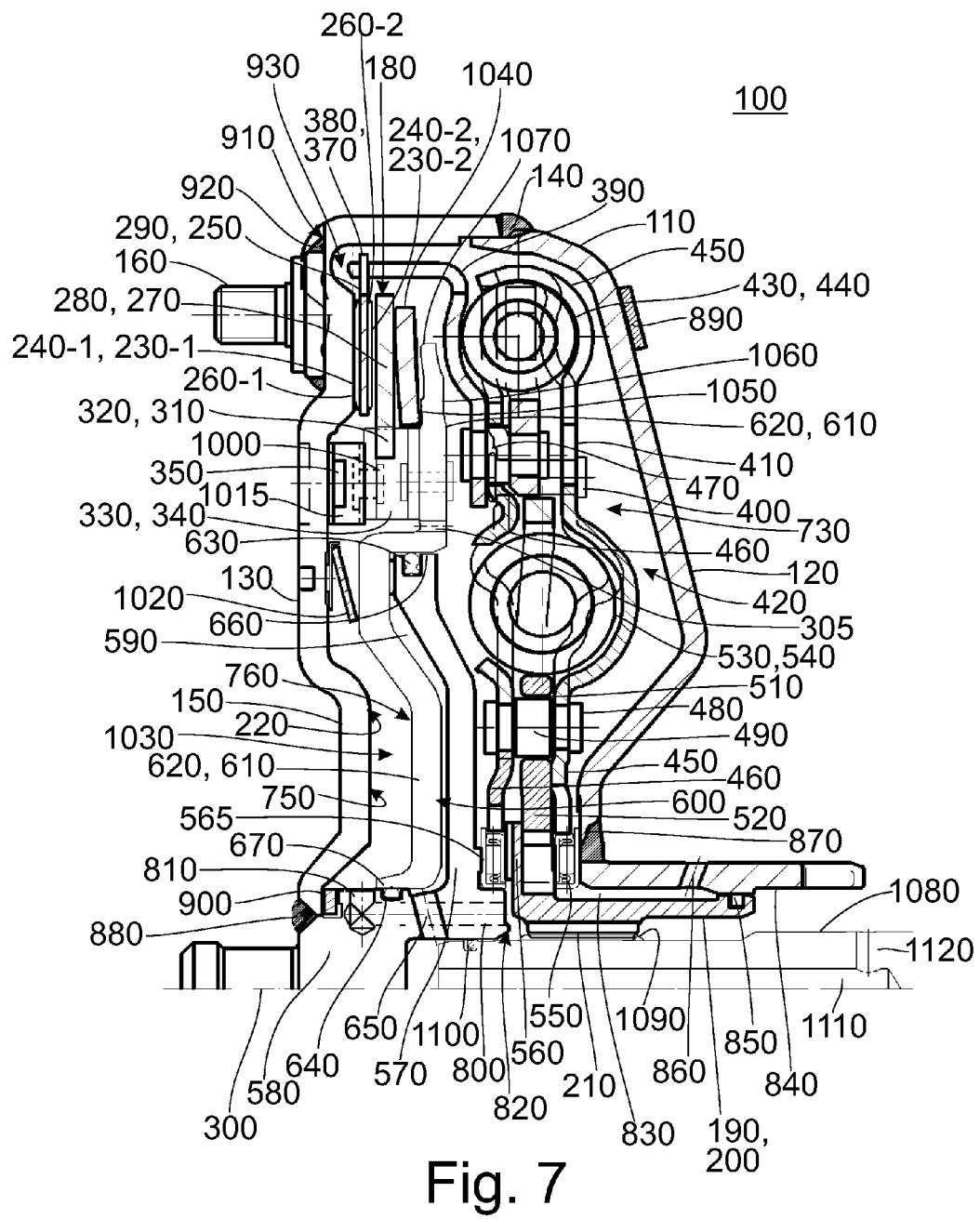
FIG. 7 shows a cross section through a further clutch arrangement according to one embodiment.
Figure 8:
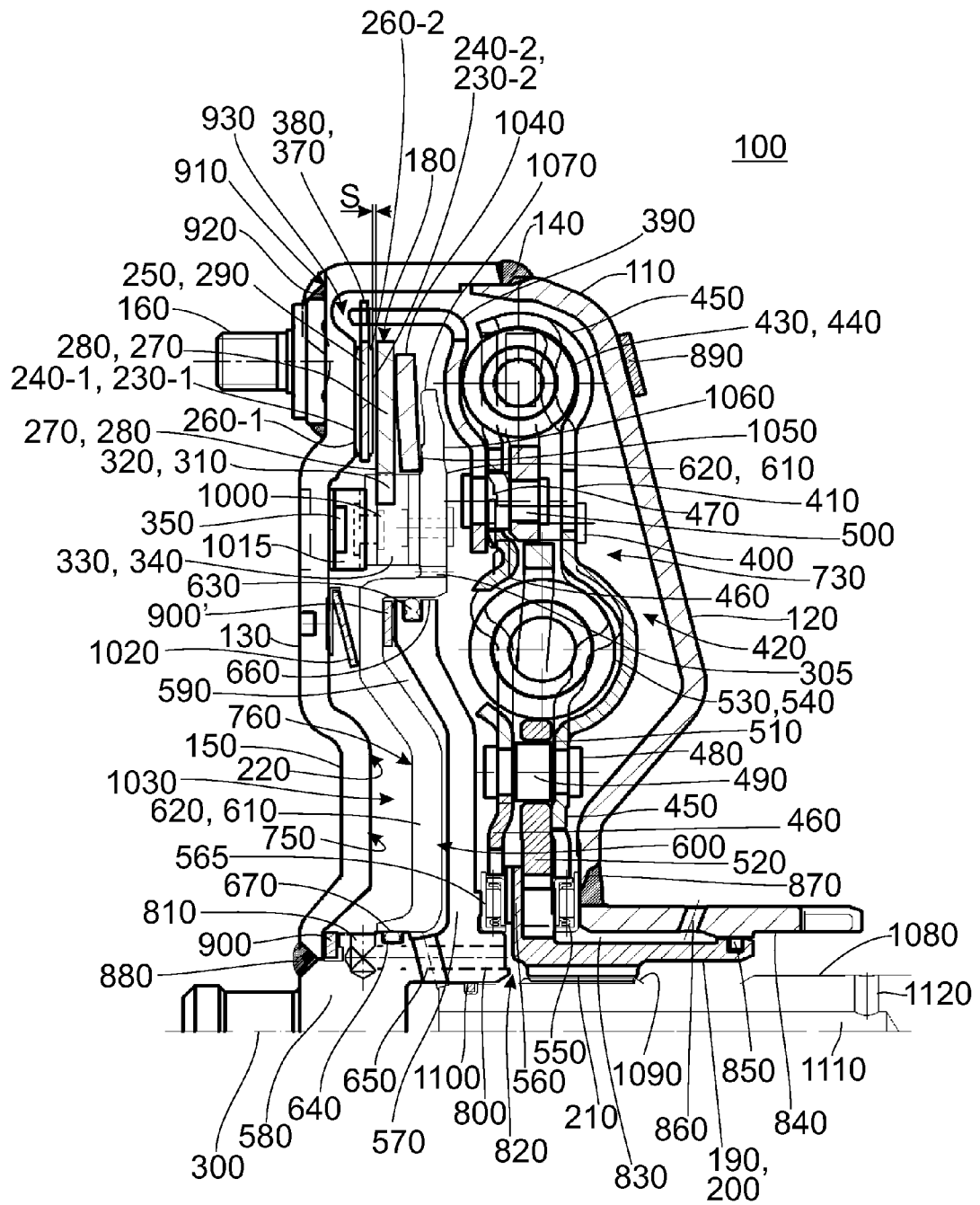
FIG. 8 shows a cross section through a further clutch arrangement according to one embodiment.
Figure 9:
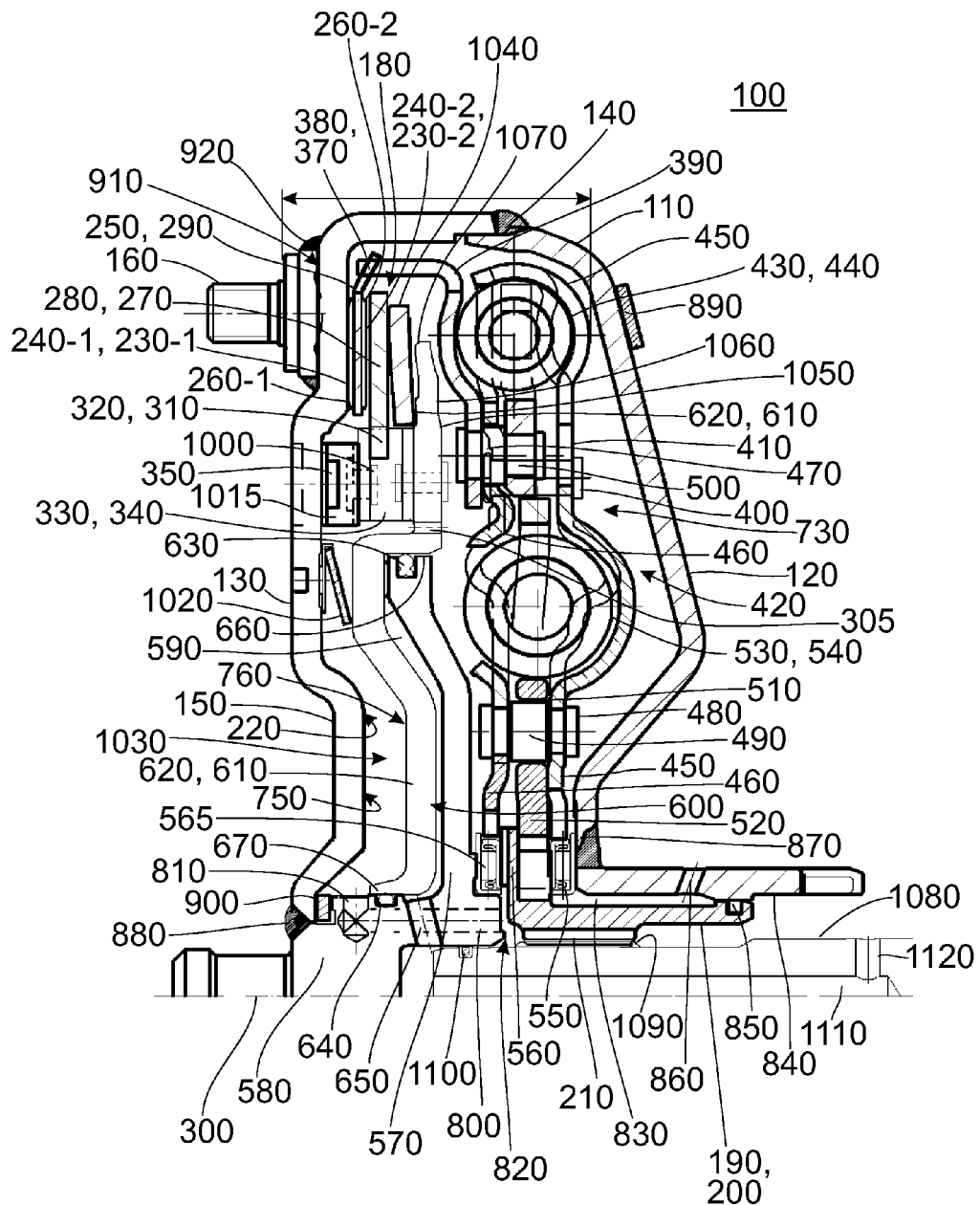
FIG. 9 shows a cross section through a further clutch arrangement according to one embodiment.

To allow a corresponding supply of fluid medium to conveying surface 330, pressing element 620 has radially at the level of conveying surfaces 330 or closer to axis of rotation 300 a passage 305, not shown in FIG. 1 but shown in FIGS. 7-9, which is also referred to as opening bore or through-opening. The through-opening is arranged radially outwardly of sealing element 360, i.e., opens into first volume 720. Accordingly, fluid medium can enter first volume 720 through the through-opening, not shown in FIG. 1, and is transported in first volume 720 radially outward through friction surfaces 230, 240 through conveying surfaces 330 which may be rotating relative to the fluid medium.

At the friction surfaces 230, 240, the flow of fluid medium enters a partial volume 730 of housing 110 in which vibration damper 420 is also arranged. In partial volume 730, the heat given off at the fluid medium can then be passed to other component parts, for example, housing 110. A portion of the fluid medium can then enter the first volume 720 again through the passage 305, not shown in FIG. 1 but shown in FIGS. 7-9, while a further portion of the fluid medium can exit partial volume 730 through bearing 550. The dividing wall 570 separates partial volume 730 from piston pressure space 590.

The conveying action of conveying component 340 is based not least of all on the fact that a flow is imposed on the fluid medium when there is a difference in rotational speed between conveying component 340 and the fluid medium. Accordingly, the conveying component can make use of a relative movement between drive component 150 and output component 190 via the above-described rotationally fixed connection.

A relative movement of this kind presents itself particularly in the region of slip, i.e., when the first friction surfaces 230 and second friction surfaces 240 contact each other but have different rotational speeds. It is precisely in this situation that a significant amount of heat is generated in the region of friction surfaces 230, 240 which should be carried off via the fluid medium. When the rotational speeds are finally in equilibrium, i.e., when clutch arrangement 100 is engaged, substantially no new heat is generated so that it is not problematic if the conveying action subsides because of similarity of speeds between conveying component 340 on the one hand and the fluid medium on the other hand when it substantially rotates along with housing 110.

Sealing element 360 separates a second volume 740 from first volume 720. Further, second volume 740 is at least partially limited by a surface portion 750 of inner surface 220 of second housing shell 130 and of a rear piston face 760. Rear piston face 760 contacts a side of pressing element 620 remote of the piston surface 600.

If a pumping action is brought about due to a relative movement of conveying component 340 with conveying surfaces 330 thereof with respect to the fluid medium, there will be a drop in (static) pressure in first volume 720 due to hydrodynamic effects. However, since sealing element 360 separates first volume 720 from second volume 740, the pressure present in second volume 740 can be maintained substantially constant regardless of a possible conveying action of conveying component 340, but at least a pressure drop possibly occurring due to other effects can be limited. In this way, even during a relative movement or pumping action due to conveying component 340, a force acting on the rear piston face 760 is not substantially affected by the conveying action and, therefore, by the movement of conveying component 340.

In other words, through the use of sealing element 360, a pressure present in second volume 740 can be maintained more constant such that upon actuation of pressing element 620 changes in pressure in the second volume brought about by introducing liquid volume into piston pressure space 590 or removing a liquid volume therefrom and, therefore, changes in force on the rear piston face 760 can be substantially eliminated, but at least reduced. By keeping the corresponding force on the rear piston face 760 more constant, it is possible to improve an engagement behavior, disengagement behavior or a definition of a particular slip situation at friction surfaces 230, 240 by controlling pressing element 620. Thus it may be possible to improve a controllability of the clutch arrangement 100 according to one embodiment through the use of the corresponding sealing element 360.

Depending on the specific embodiment of sealing element 360, it may be possible to reduce the size of second volume 740 or to increase the size of second volume 740 by changing a radial position of sealing element 360. However, the actual size of first volume 720 can be much less crucial than a position and/or a size of a surface portion of pressing element 620 which at least partially limits second volume 740. During a rotation of clutch arrangement 100, centrifugal forces occur on the fluid medium located in second volume 740 and in piston pressure space 590.

These centrifugal forces cause a pressure to build up which acts on pressing element 620 from both sides and which causes oppositely directed forces. Therefore, the radial position of sealing element 360 or the transitional area 790 thereof has an influence on whether or not an additional effective force is brought about on pressing element 620 due to the effect of centrifugal force because of changes in pressure, on the magnitude of this force and on the direction in which this force takes place.

For example, if transitional area 790 of sealing element 360 is displaced closer to axis of rotation 300 so that an extension of the surface portion of pressing element 620 along radial direction is reduced and second volume 740 is made smaller, the forces acting on pressing element 620 from second volume 740 are also smaller. Accordingly, a pressure acting in piston pressure space 590 due to centrifugal force leads to a greater effective force on pressing element 620 compared to the unaltered position of sealing element 360. The centrifugal forces occurring in piston pressure space 590 are therefore under-compensated.

Correspondingly, however, varying the location at which the transitional portion 790 is arranged also makes it possible to over-compensate for, or substantially fully compensate for, the centrifugal force pressure acting on pressing element 620. In this respect, it may be advisable that the pressure occurring in second volume 740 under the relevant circumstances due to centrifugal forces is dimensioned such that it is neither too large nor too small to impede or even prevent an engaging movement or disengaging movement of pressing element 620.

As has already been mentioned, sealing element 360 is further configured not only to fluidically separate first volume 720 from second volume 740, but is further configured to exert a force on pressing element 620 or another component having an at least partially disk-shaped portion such that pressing element 620 returns to its starting position when not actuated. In other words, sealing element 360 is configured in such a way that it exerts a force on pressing element 620 which tries to let pressing element 620 be brought back to the starting position thereof when pressing element 620 is not actuated. The sealing element can correspondingly also exert a force such that pressing element 620 returns to its starting position.

In the starting position shown in FIG. 1, particularly the frictional engagement between the first friction surfaces 230 and second friction surfaces 240 is canceled or at least decreased to the extent that no significant torque is transmitted via clutch arrangement 100. In this case, the actuation of pressing element 620 is carried out by introducing a corresponding fluid volume through the inlet bore 650 to piston pressure space 590.

To enable this dual functionality of sealing element 360, sealing element 360 has a first sealing surface 770 and a second sealing surface 780 which are connected to each other through a transitional portion 790. First sealing surface 770 and second sealing surface 780 are both oriented substantially perpendicular to axis of rotation 300 and spaced apart along the latter. The two sealing surfaces 770, 780 are also spaced apart along radial direction, i.e., perpendicular to axis of rotation 300, second sealing surface 780 being arranged radially inwardly of first sealing surface 770 in the sealing element 360 shown in FIG. 1. Accordingly, transitional portion 790 has a conical outer surface shape. The arrangement of the two sealing surfaces 770, 780 along radial direction can also be switched in other embodiments.

The two sealing surfaces 770, 780 lie on corresponding planes or annular portions of housing 110 or second housing shell 130, respectively, and pressing element 620. Depending on the specific embodiment, these sealing surfaces 770, 780 may be surface-treated, i.e., for example, turned, to form corresponding counterpart sealing surfaces.

When a deformation of sealing element 360 is brought about due to a movement of pressing element 620, this results, not least, in a deformation of transitional portion 790, and there is initially a tendency for an area-type support because of the flat configuration of the two sealing surfaces 770, 780 even in the event of a deformation of the same or a change in the geometrical orientation of the same relative to pressing element 620 and second housing shell 130. However, a lifting off or rolling off of at least a portion of one of the two sealing surfaces 770, 780 can also come about depending on the degree of deformation of sealing element 360.

In this case, it may come about that the relevant sealing surfaces 770, 780 only contact the corresponding component part, i.e., pressing element 620 or second housing shell 130, in a line-shaped manner at least in some areas, but possibly also in all areas. Typically, however, there is always at least one line-shaped contacting area. Accordingly, even in case of a movement of pressing element 620, a sealing action of sealing element 360 can be at least partially maintained.

Moreover, to better secure sealing element 360 to second housing shell 130, sealing element 360 has at a side remote of transitional portion 790 a portion which is adapted to a shape of second housing shell 130 so that in this way a positive engagement connection is formed in radial direction and in axial direction, i.e., along axis of rotation 300. This positive engagement connection may also be configured only as an aid to assembly or as a centering aid for sealing element 360.

In addition or alternatively, the portion, also referred to as collar or edge, can also be provided for mechanical stabilization of sealing element 360. Accordingly, a deformation of sealing element 360 in circumferential direction during a displacement of pressing element 620 along axis of rotation 300 may be reduced or completely prevented by this portion. For example, corrugations along the circumferential direction can occur under corresponding loads. Also, the shapes of sealing element 360 and of second housing shell 130 need not be adapted in the manner described above.

Accordingly, in the embodiment of a clutch arrangement 100 shown in FIG. 1, sealing element 360 serves not only for the fluidic separation of first volume 720 and second volume 740, but also carries out the additional function of returning pressing element 620 to a starting position before an actuation of the same so that clutch arrangement 100 is, in particular, a normally open clutch arrangement. Sealing element 360 may also be reinforced where applicable by a further corresponding spring element, for example, in the form of a supplementary disk spring, diaphragm spring, leaf spring or coil spring.

In other embodiments, sealing element 360 can also exert a force on pressing element 620, or another component part, such that clutch arrangement 100 is a normally closed clutch arrangement in which there is a frictional engagement between first friction surfaces 230 and second friction surfaces 240 without an actuation. In other words, sealing element 360, which is also referred to as sealing plate, can be not only pre-loaded in compression as is shown in FIG. 1 but also pre-loaded in tension. In this way, a normally closed clutch arrangement can be realized, for example.

The clutch arrangement 100 shown in FIG. 1 is a three-line type in which the inlet bore 650 is one of the three lines or channels by which piston pressure space 590 can be charged with the fluid medium, possibly also with a different fluid medium. To enable a movement of pressing element 620, second volume 740 is fluidically connected via a feed channel 800, shown in dashes in FIG. 1, which leads into a feed 810 to second volume 740. In this case, feed channel 800 opens into an inlet region 820 which is guided along the transmission input shaft, not shown in FIG. 1. Feed channel 800 and feed 810 allow the fluid medium to flow in and out when there is a movement of pressing element 620. Accordingly, they serve to compensate for the corresponding volume.

Inlet region 820 is connected to an inlet for the fluid medium, i.e., the oil or transmission oil, via several tooth voids in the internal toothing 210 and corresponding external toothing of the transmission input shaft. One, two, or more adjacent teeth are frequently omitted in the region of internal toothing 210 and the corresponding external toothing of the transmission input shaft, not shown in FIG. 1, at a plurality of locations along the circumference of the corresponding teeth so that oil passage conduits are formed at these locations which fluidically couple the inlet region with the transmission. Specifically, two adjacent teeth are missing from the relevant toothing at three locations in the embodiment shown in FIG. 1 to form the oil passage conduits.

Not only is second volume 740 supplied with fluid medium via inlet region 820, but partial volume 730 is also fluidically connected via inlet region 820 and oil guide conduits integrated in bearing 565. In other words, the oil flows in through internal toothing 210 and the corresponding external toothing of the transmission input shaft, inlet region 820 and the oil guide channels of bearing 565. The inlet bore 650 to piston pressure space 590 is separated from inlet region 820 by a seal, also not shown in FIG. 1. Accordingly, inlet region 820 constitutes the second line.

The fluid medium can exit partial volume 730 via corresponding oil guides or oil guide channels in bearing 550 and an outlet region 830. Outlet region 830 is formed between lower hub 200 and a pump hub 840 and has a substantially annular cross section. Pump hub 840 is sealed relative to lower hub 200 using a sealing element 850. The fluid medium which has entered outlet region 830 can then be discharged via an opening 860, also referred to as oil discharge. In the clutch arrangement 100 shown in FIG. 1, the opening 860 is connected to the sump of the transmission or also to another receptacle for the oil or fluid medium. Accordingly, together with outlet region 830, opening 860 forms the third line.

In many cases, the conveying volume which can be circulated through conveying component 340 with its conveying surfaces 330 in the interior of housing 110 is many times greater than a volume which is supplied to and removed from housing 110 via inlet region 820 and outlet region 830, respectively. Accordingly, a volume flow is often generated using conveying surfaces 330 of conveying component 340, but also using other structures in the interior of housing 110 which assist in conveying the fluid medium.

This volume flow can be at least five times, at least ten times, at least fifteen times, or at least twenty times the volume of fluid medium made available through inlet region 820 of clutch arrangement 100, but may also be smaller than these values. The ratios indicated in this respect refer to a maximum amount conveyed by conveying component 340. These conveying surfaces 330 generating a forced flow in the respective housing 110 which is filled with fluid and which rotates around the axis of rotation make use of precisely the effect of different rotational speeds at the drive side and driven side of clutch arrangement 100, i.e., the different rotational speeds at drive component 150 and output component 190. Conveying surfaces 330 act like an impeller with respect to the circulation of the fluid medium or like a turbine in a hydroclutch or hydrodynamic torque converter.

Pump hub 840 is connected to first housing shell 120 of housing 110 via a weld 870. Second housing shell 130 is also connected to front hub 580 via a weld 880 so that, in connection with weld connection 140 which may be formed, for example, as a weld seam and connects the two housing shells 120, 130, a closed volume is formed with partial volume 730 and with first volume 720 and second volume 740.

The corresponding welds 870, 880 and 140 can be formed as weld seams or as spot welds. These connection techniques can also be exchanged for other connection techniques which are adapted and suited to the conditions of use.

FIG. 1 further shows a balance weight 890 which is welded to first housing shell 120 in the present case. It serves to compensate for imbalances induced by design or assembly or from other causes and can thus reduce corresponding imbalances in the drivetrain of the vehicle. However, the position of the balance weight shown in FIG. 1 can vary in other embodiments.

Further, a spacer disk 900 is inserted between the feed 810 formed as part of front hub 580 and the housing 110, more accurately the second housing shell 130. As will be described briefly in the following, this spacer disk 900 serves to adjust a clearance between the plates, i.e., to adjust the clearance between first friction surfaces 230 and second friction surfaces 240. The clearance between friction surfaces 230, 240 determines the capacity of clutch arrangement 100 to interrupt the torque flow on the one hand and a response behavior during engagement and disengagement of clutch arrangement 100 on the other hand.

While clearances S tending to be larger are specified in the interest of a reliable separation of friction surfaces 230, 240 and, therefore, in the interest of a reliable separation of the torque flow, these clearances S must be bridged by pressing element 620 in case of engagement and disengagement. Accordingly, it is precisely during a controlled engagement of clutch arrangement 100 that a delayed formation of the frictional engagement can come about, since the clearance must be bridged by pressing element 620 beforehand. Therefore, an adjustment of the clearance of the plates may improve a relationship between a response behavior of the clutch on the one hand and wear of first friction surfaces 230 and second friction surfaces 240 and a separability of clutch arrangement 100 on the other hand.

To this end, clutch arrangement 100 according to one embodiment has the spacer disk 900 which was described above. Spacer disk 900 can be adapted—within corresponding acceptable tolerance ranges—to the respective component dimensions of inner plates 270, outer plates 250, friction facings 260 and the other components which may be provided and which have an influence on the plate clearance S. In this respect, the plate clearance can be carried out based on previously measured component dimensions as well as in the course of a (partial) assembly of clutch arrangement 100 and a corresponding determination or measurement of the plate clearance along axis of rotation 300.

When the plate clearance S has been determined in one of the ways described above, an appropriate spacer disk 900, for example, from a set of ready-made spacer disks, can then be inserted. This spacer disk may also be machined individually. After insertion of the corresponding spacer disk 900, housing 110 of clutch arrangement 100 can then be closed, for example, by the welds 870, 880, 140 shown in FIG. 1, after assembly is finished.

Further, spacer disk 900 can also be implemented as a two-part or multi-part solution. In the two-part or multiple-part solution of the spacer disk, this spacer disk can comprise a first spacer disk component part and a second spacer disk component part which at least partially have a wedge-shaped profile along the circumference thereof. In this way, by rotating the two spacer disk component parts relative to each other, a thickness of the spacer disk along axis of rotation 300, i.e., along axial direction, can be changed by rotating the two parts relative to each other.

By inserting a two-part or multiple-part spacer disk of this kind, i.e., a spacer disk 900 with a plurality of spacer disk component parts, the plate clearance S between friction surfaces 230, 240 can be adjusted by rotating second housing shell 130 relative to front hub 580 in case of the installed position of spacer disk 900 shown in FIG. 1.

In the embodiment of a clutch arrangement 100 shown in FIG. 1, second housing shell 130 has a planar portion 910 at an outer surface of housing 110 to which the weld bolt is fastened for fastening clutch arrangement 100 or for fastening housing 110 to a flexplate of an engine or other drive unit. To this end, weld bolt 160 is connected to the planar portion 910 of housing 110 by a weld 920. However, housing 110 or second housing shell 130 has at the inner surface 220 facing the inner volume a recess 930 in this area so that second housing shell 130 has a smaller material thickness in this area than in other areas.

This makes it possible to configure the support 390 for outer plates 250 in such a way that support 390 projects into recess 930. In this way, outer plate 250-1 can also be constructed as a planar disk without the risk of portion 370-1 or further driver surface 380-1 touching the housing 110 even under adverse operating conditions. Accordingly, an outer plate 250-1 identical to outer plate 250-2 can be used without having to take special measures in the area of portion 370 or allow for other features of the design thereof.

A recess 930 of this type which is located opposite a planar portion 910 at housing 110 can be carried out, for example, by providing a so-called S-stroke in the area of second housing shell 130. The S-stroke can be provided along the entire circumference, whereas planar portion 910 can be restricted to narrow spatial areas along the circumferential direction in which a connection to weld bolt 160 is to be made.

Once the S-stroke has been introduced in second housing shell 130, planar portion 910 can be provided by pressing in second housing shell 130 in the area of the planar portion 910 to be generated. The material penetrating into the interior of housing 110 in so doing, i.e., the material penetrating the inner surface 220 of second housing shell 130, can then be removed, for example, by turning or by some other cutting method, to form recess 930.

The step, described with reference to FIG. 1, of generating planar portion 910 for receiving weld bolt 160 or another stud for fastening the clutch arrangement to a drive unit or other unit may be useful or necessary, for example, in a clutch arrangement 100 in which a particular position of the drivetrain or components thereof is necessary. The clutch arrangement 100 shown in FIG. 1, for example, is one determined for transverse installation, i.e., for mounting transverse to the longitudinal axis of the vehicle. However, embodiments of a clutch arrangement of this type are in no way limited to such clutch arrangements. On the contrary, they can also be utilized for longitudinally installed engines and gear units.

Merely in the interest of thoroughness, it should be mentioned here again that pressing element 620 is not coupled with housing 110 by a positive engagement connection. That is, if the non-positive or frictionally locking connection brought about by nose 690 and other components is overcome, pressing element 620 is "freely" rotatable relative to housing 110. A situation of this kind can occur, for example, when there is an abrupt change in rotational speed without a renewed engagement of clutch arrangement 100. Examples of this include braking the vehicle to a standstill (standstill of the output component 190) starting from a high engine speed, to name only one example. In a situation of this kind, the free rotatability of pressing element 620 may lead to noise development from the region of clutch arrangement 100, which may be perceived by the driver as annoying, for example.

Figure 2:
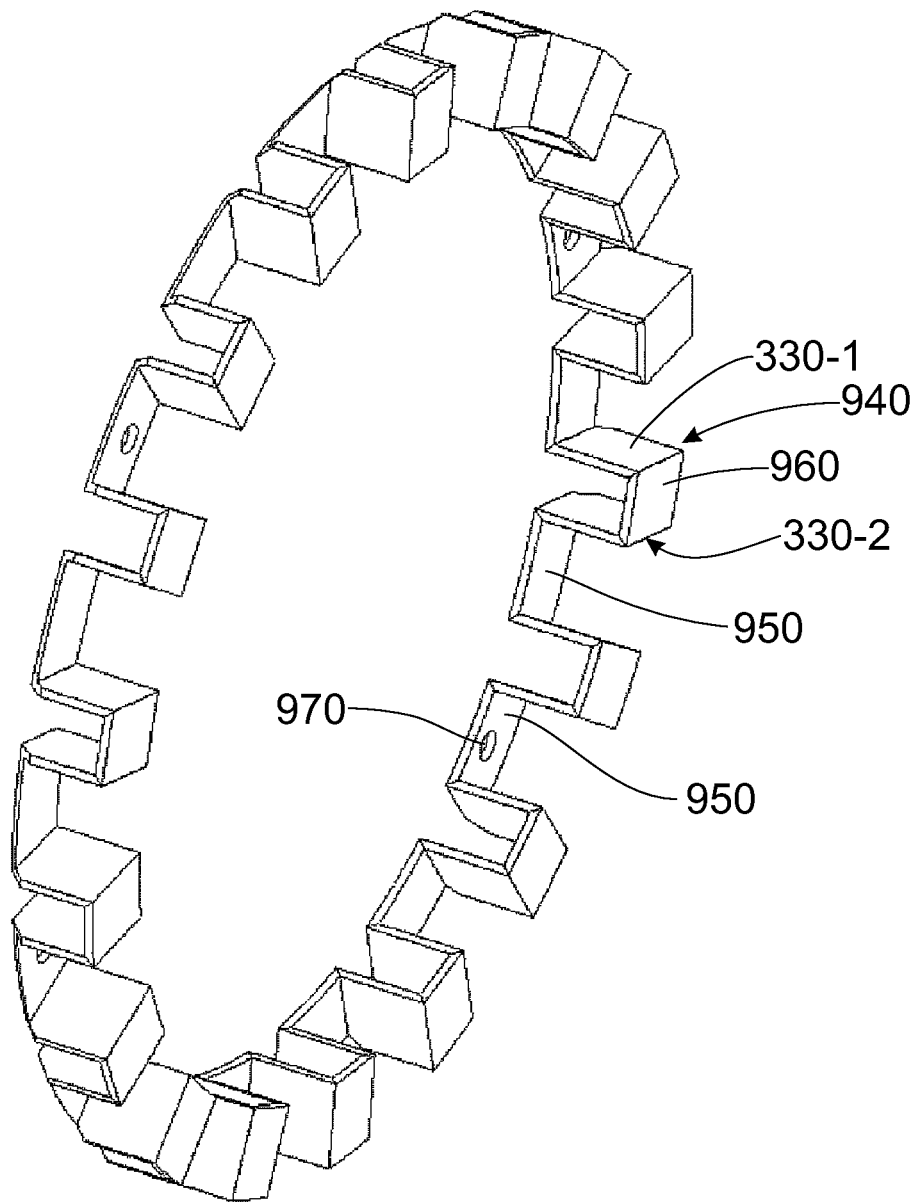
FIG. 2 shows a perspective view of the conveying component of the clutch arrangement according to FIG. 1.

FIG. 2 shows a three-dimensional view of conveying component 340 as it is used in clutch arrangement 100 in FIG. 1. Conveying component 340, also referred to as plate driver, is constructed substantially as a complete ring, i.e., annularly. Conveying component 340 has a plurality of teeth 940 which are uniformly arranged along the circumference of conveying component 340 and which project above ring-segment-shaped portions 950 of conveying component 340. Teeth 940 are arranged at regular, equally spaced intervals.

Each of the teeth, only one of which is identified by a reference numeral in FIG. 2, has substantially two tooth flanks which extend perpendicular to portion 950 and form conveying surfaces 330. In the tooth identified in FIG. 2 as tooth 940, the two conveying surfaces 330-1 and 330-2 are joined to each other by a top surface 960.

As has already been mentioned in connection with FIG. 1, conveying component 340 in the embodiment shown therein is connected to housing 110, i.e., to the cover of clutch arrangement 100, via rivet connection 350. For guiding the rivet, conveying component 340 has at some portions 950 corresponding openings 970 through which the rivet connection to housing 110 or second housing shell 130 is provided. Specifically, the conveying component shown in FIG. 2 has a total of six openings 970 which are evenly distributed along the circumference of conveying component 340. In other embodiments, a different quantity of openings 970 can be implemented and can be arranged in an evenly or irregularly distributed manner.

In this case, conveying component 340 is formed integral, i.e., is fashioned from exactly one contiguous piece of material. Apart from the starter material piece and the openings 970, conveying component 340 has been produced by deforming a sheet-like workpiece. Accordingly, a comparatively simple and, therefore, inexpensive production method can be used. In other embodiments in which the requirements may be more exacting with respect to loads or for other constraints, a different production method may appear more reasonable, and cutting production methods or casting production methods can be used to provide the corresponding conveying component 340.

Figure 3:
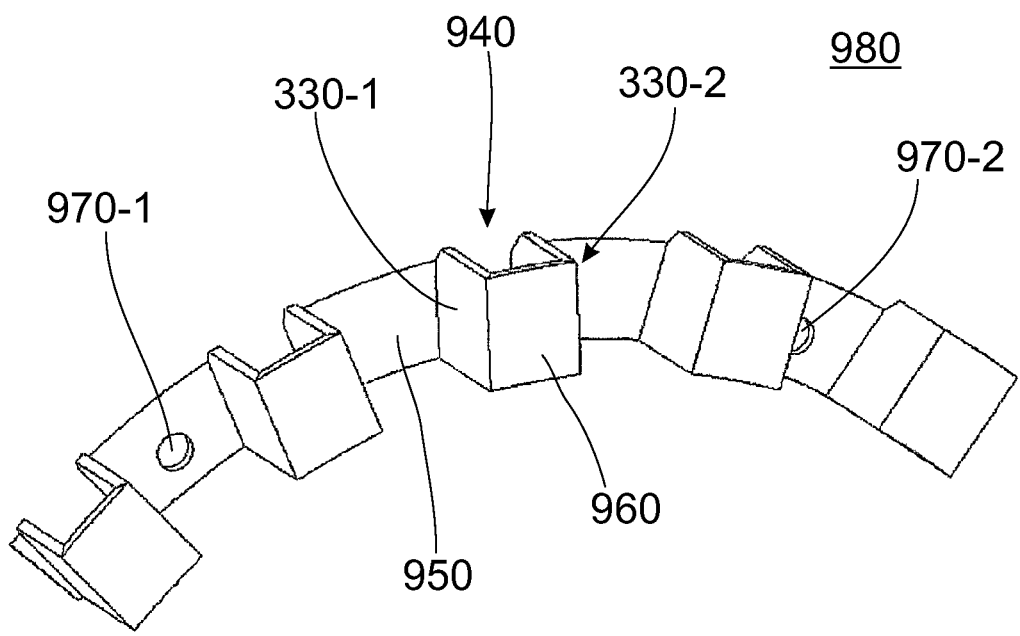
FIG. 3 shows a perspective view of a conveying component segment of a clutch arrangement according to one embodiment.

FIG. 3 likewise shows a perspective or three-dimensional view of a conveying component segment 980. Conveying component segment 980 is formed in a ring-segment-shaped manner and also in one piece by deforming a sheet-like workpiece. Conveying component segment 980 has a length along the circumference that approximately corresponds to a 90-degree segment. Accordingly, when four corresponding conveying component segments 980 are joined together, for example, in a cover-side fastening such as is shown in FIG. 1, this results in a conveying component 340 as shown in FIG. 1. In other words, in one embodiment of a clutch arrangement 100, conveying component 340 can also comprise a plurality of, for example, four, conveying component segments 980. Other quantities of conveying component segments 980 can also be used in other embodiments to produce a conveying component 340 within the framework of a clutch arrangement 100 according to one embodiment.

The conveying component segment shown in FIG. 3 also comprises a corresponding plurality of teeth 940 which project out over portions 950 and which have at lateral surfaces thereof conveying surfaces 330 extending substantially perpendicular to portions 950. Conveying surfaces 330 are in turn connected to one another by a top surface 960. To fasten the conveying component segments 980 to housing 110, these conveying component segments 980 also have openings 970 for riveting or plug-in contact, possibly also for a screw connection or other fastening technique. However, two openings 970-1 and 970-2 are already provided in the conveying component segment 980 shown in FIG. 3 so that the conveying component 340 resulting when four corresponding conveying component segments 980 are arrayed is connected to housing 110 by a total of eight plug-in connections or rivet connections.

Regardless of the exact implementation of conveying component 340 in the embodiment shown in FIG. 1, a clutch arrangement 100 according to one embodiment makes it possible to combine the functionality of furnishing a flow of fluid medium, i.e., oil, for example, with the driving of first component 280, i.e., for example, inner plates 270, using collective use of conveying surface 330. In this way, embodiments of a clutch arrangement 100 of this type make it possible to drive plates 270 in a wet clutch without having to provide an additional plate carrier for the relevant inner plates. In this case, conveying component 340 simultaneously carries out the additional function of vanes for generating the internal oil circulation. Clutch arrangements 100 according to one embodiment can be implemented as multiplate clutches or as single-disk clutches.

The driving of plates 270 (first component 280) is realized in the multiplate clutch arrangement shown in FIG. 1 using the meander-shaped element, namely, conveying component 340. As is shown in FIG. 2, conveying component 340 can be implemented as a one-part solution or, as is shown in FIG. 3, as a plurality of segments. In this case, conveying surfaces 330 generate the internal oil circulation, but serve at the same time to drive the plates.

As was shown in FIG. 1, conveying component 340 can be arranged on the engine side at the cover of the housing, i.e., at second housing shell 130, using rivets or other connection techniques to transmit the torque of the engine to plates 270. Accordingly, the embodiments shown in FIGS. 1 to 3 are clutch arrangements 100 in which the plate driver is arranged at the cover side. Clutch arrangements 100 can be used for high torques of several hundred newton meters (Nm), but clutch arrangements 100 according to embodiments in which higher or lower maximum torques can be transmitted can also be implemented.

Figure 4:
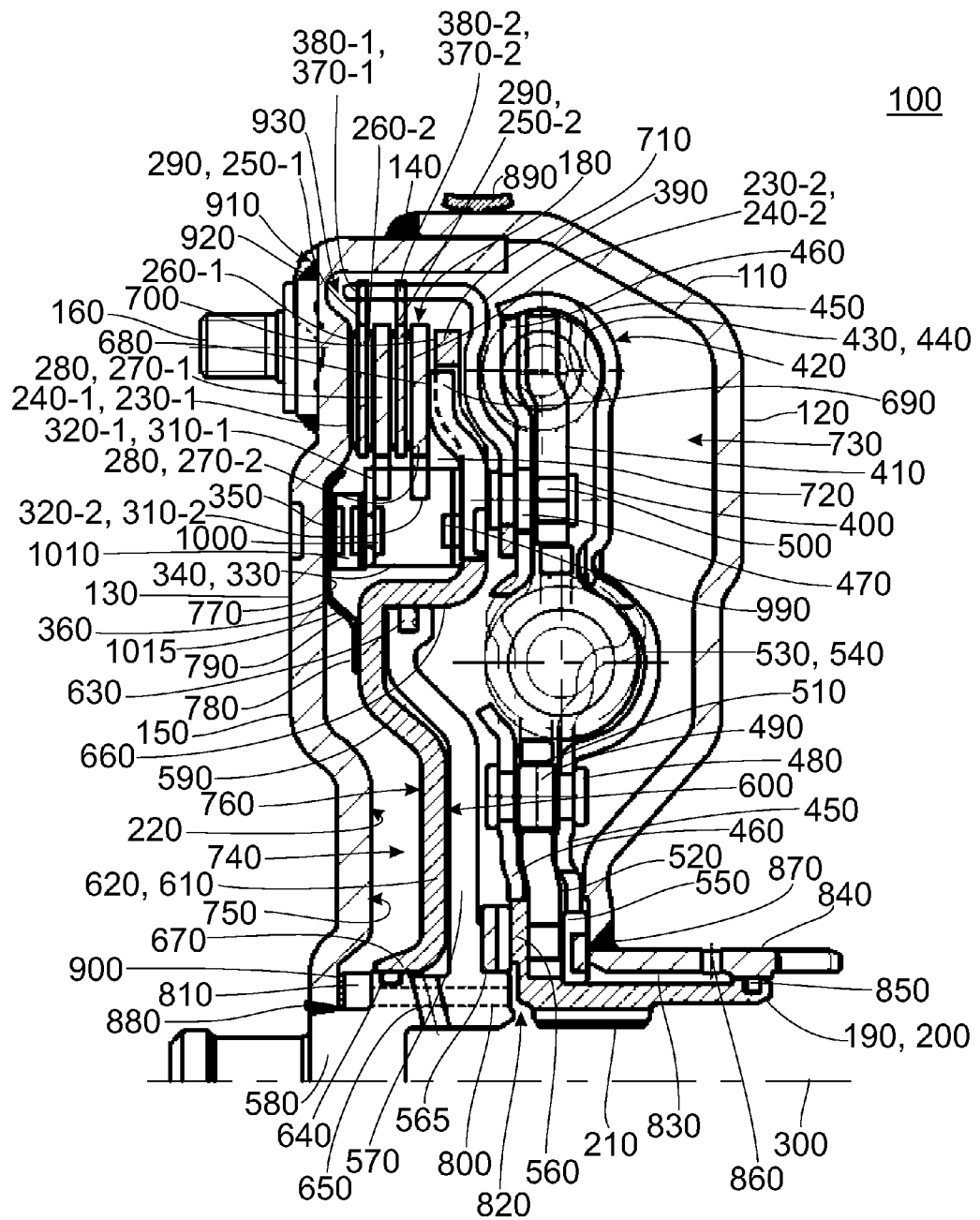
FIG. 4 shows a cross section through a further clutch arrangement according to a further embodiment example.

FIG. 4 shows a corresponding overall system of a clutch arrangement 100 according to one embodiment, but in which conveying component 340 is fastened on the piston side.

Figure 5:
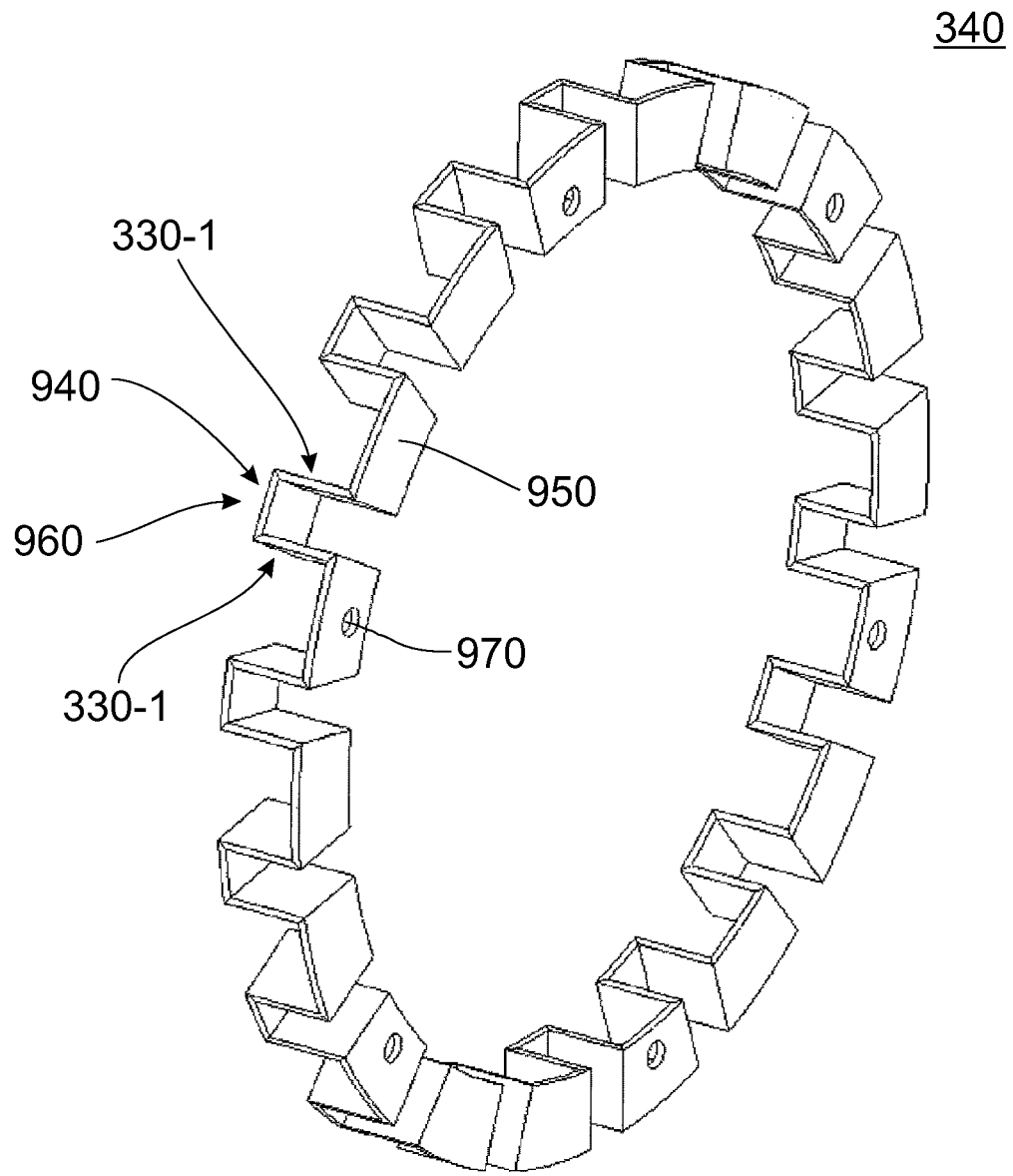
FIG. 5 shows a perspective view of a possible conveying component of the clutch arrangement from FIG. 4.
Figure 6:
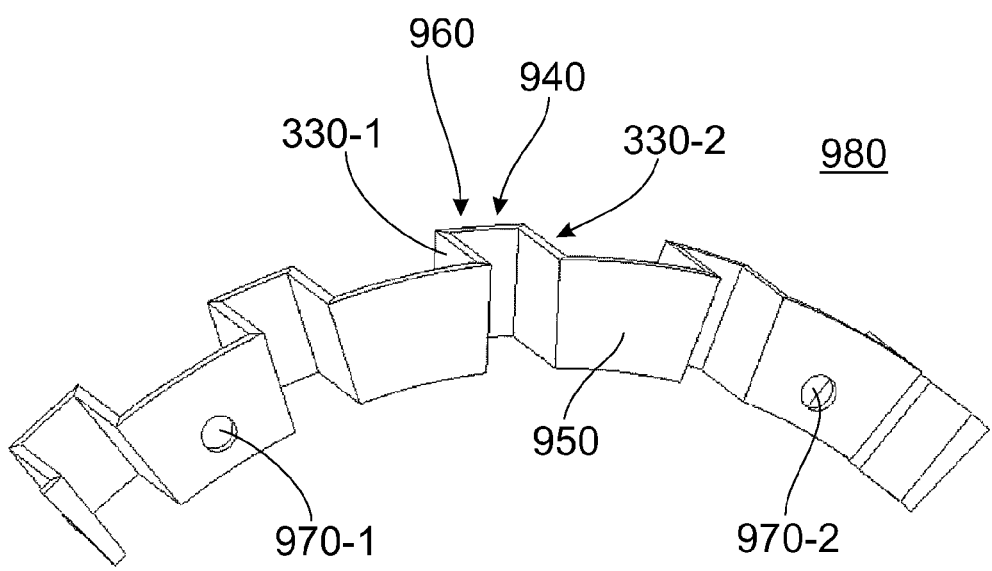
FIG. 6 shows a perspective view of a conveying component segment of a clutch arrangement according to one embodiment.

Accordingly, while the clutch arrangement 100 according to one embodiment shown in FIG. 4 still also has a sealing element 360, it is no longer directly connected to conveying component 340 via its rivet connection 350 which connects sealing element 360 to second housing shell 130 (cover). Rather, conveying component 340, which is shown in more detail in FIGS. 5 and 6, is connected to pressing element 620 via a rivet connection 990 by positive engagement and, therefore, to be fixed with respect to rotation relative to it.

Accordingly, for example, conveying component 340 can be connected by positive engagement to a plurality of leaf spring elements 1010 via additional rivet connections 1000, these leaf spring elements 1010 being implemented as part of sealing element 360. Leaf spring elements 1010 are formed out through a shaping of the material of sealing element 360 and are therefore fashioned integral with it. In other embodiments, however, leaf spring elements 1010 can also be fashioned as separate components or using other production methods in case they are formed integral with sealing element 360.

Other forms of torque transmission may be implemented in other embodiments. For example, it is also possible to use leaf spring elements 1010 in which there are no holes for receiving rivet connections or other connection elements. It may also be possible, for example, to initially form leaf spring elements 1010 at an outer diameter or inner diameter of sealing element 360 and, for example, to deform them inward by more than 120° in the course of bending. It may also be possible to implement the corresponding transmission of torque via a frictionally engaging connection.

Since sealing element 360 is connected to the cover, i.e., second housing shell 130, to be fixed with respect to rotation relative to it via rivet connection 350, a substantially rotationally fixed connection results between the housing 110 serving as drive component 150 and the pressing element 620. In this case, therefore, sealing element 360 is also a connection component 1015. Accordingly, compared with the clutch arrangement 100 shown in FIG. 1, pressing element 620 is no longer "freely" rotatable but, rather, is connected to housing 110 in a substantially positively engaging manner. Therefore, even when there is an abrupt change in rotational speed without renewed engagement of clutch arrangement 100, a corresponding development of noise due to a freely rotating pressing element 620 will not occur in this implementation.

The connection between pressing element 620 and housing 110 can only be substantially rotationally fixed because torsion can occur between pressing element 620 and housing 110 due to, e.g., deformations, thermal effects or because of the geometric relationships given by the leaf spring elements 1010 during an axial displacement of pressing element 620. However, regardless of this, pressing element 620 follows the rotational movement of housing 110 in the embodiment shown herein.

Accordingly, in the variant shown in FIG. 4, conveying component 340 is arranged on the piston side, a connection to the second housing shell 130 serving as cover being carried out using leaf spring elements 1010 to transmit the torque of the engine to inner plates 270 via conveying surface 330. The leaf springs or leaf spring elements 1010 accordingly provide the connection of conveying component 340 to the engine-side second housing shell 130.

The leaf spring elements 1010 project into first volume 720 so that during a rotation of housing 110 and, therefore, during a rotation of conveying component 340 relative to the fluid medium in the interior of housing 110, these leaf spring elements 1010 likewise reinforce the conveying of fluid and, therefore, the generation of the flow of the fluid. Leaf spring elements 1010 also reinforce the conveying of oil.

Whereas, for the most part, rivet connections 990, 1000, 350 were discussed heretofore, other connection techniques can also be used to produce the corresponding substantially rotationally fixed connection between housing 110 and conveying component 340. For example, the corresponding rivet connections can also be individually or collectively replaced by or supplemented by a different connection technique, for example, a plug-in connection, but also by other positive, frictional and/or bonding connections.

In a corresponding embodiment example, the use of leaf spring elements 1010 can also be substituted by other components provided that they also reinforce, or at least do not hinder, an axial displacement of pressing element 620, i.e., along axis of rotation 300.

FIG. 5 shows a three-dimensional view of conveying component 340 as it is used in the embodiment of a clutch arrangement 100 shown in FIG. 4. The conveying component 340 differs only slightly from the conveying component shown in FIG. 2 with regard to shape. This conveying component 340 is also constructed as a complete ring which has likewise been produced in one piece through deformation of a corresponding sheet-like piece of material. Here also, conveying component 340 has a plurality of teeth 940 which project over planar portions 950. Accordingly, the conveying surfaces 330 which are connected by top surface 960 extending substantially parallel to portions 950 project substantially perpendicular to the planar portions 950. Here also, some of the portions 950 have openings 970 by which the conveying component 340 can be connected to the pressing element 620 by the rivet connection. To fasten the conveying component 340, the latter has a total of six openings 970 in the present case, although the number of openings 970 may vary in other embodiments.

In the conveying component 340 shown in FIG. 5, there are no openings or other structures shown in the top surfaces 960 for fastening the further rivet connection 1000. However, in contrast to FIG. 5, corresponding openings through which conveying component 340 can be connected to the leaf spring elements 1010 can be provided in some or all of the top surfaces 960 of teeth 940. Alternatively, it may also be possible to dispense with the implementation of the further rivet connections 1000 by connecting the leaf spring elements 1010 directly using rivet connections 990 and openings 970. In this way it may also be possible to prevent additional shear stress on teeth 940.

FIG. 6 shows a view of a conveying component segment 980 corresponding to FIG. 3 in which the conveying component segment 980 is likewise constructed as a ring-segment-shaped component part and substantially forms a 90-degree segment of the conveying component 340. However, this is again a conveying component segment 980 of a conveying component 340 for fastening on the piston side.

The conveying component segment 980 shown in FIG. 6 can also have further openings, not shown in FIG. 6, in the region of the top surfaces 960 depending on the specific implementation of the associated conveying component 340. In other respects, it substantially corresponds to the conveying component segment 980 from FIG. 3 on condition that this conveying component segment 980—as is shown in FIG. 5—is provided for piston-side fastening. The orientations of teeth 940 and conveying surfaces 330 are to be understood in a corresponding manner.

FIG. 7 shows one embodiment of a clutch arrangement 100 according to one embodiment. The clutch arrangement 100 from FIG. 7 differs from the clutch arrangement shown in FIG. 4 with respect to some components which will be mentioned in the following. However, the differences between the two clutch arrangements 100 are negligible with respect to the further components.

It should be noted first that the clutch arrangement 100 shown in FIG. 7 has a smaller quantity of inner plates 270 and outer plates 250. Specifically, clutch arrangement 100 has only one outer plate 250 and one inner plate 270. Inner plate 270 which represents first component 280 engages with conveying surface 330 of conveying component 340 again via its driver surface 320 of portion 310. Correspondingly, conveying component 340 is constructed to be shorter with respect to its dimension along axis of rotation 300, i.e., along axial direction.

Beyond this, clutch arrangement 100 differs further from the clutch arrangement shown in FIG. 4 in that the two bearings 565, 550 enabling the axial guidance of output component 190, i.e., lower hub 200, are constructed as needle bearings in this clutch arrangement 100. Other axial and/or radial rolling bearings or friction bearings or combinations thereof can also be used in other embodiments.

The clutch arrangement 100 from FIG. 7 differs further from that shown in FIG. 4 in that second housing shell 130 now overlaps first housing shell 120 in the region of weld connection 140, i.e., outwardly limits clutch arrangement 100 or housing 110 thereof. Correspondingly, the balance weight 890 is also no longer positioned to be located on the radially outer side, but is arranged at a side of housing 110 remote of the weld bolt 160.

The clutch arrangement 100 from FIG. 7 differs further from that in FIG. 4 in that, instead of sealing element 360, a disk spring 1020 is arranged between second housing shell 130 and pressing element 620. Like sealing element 360 in FIG. 4, disk spring 1020 is pre-loaded in compression so that in this case again the clutch arrangement 100 according to one embodiment is a normally open clutch arrangement. In contrast to sealing element 360, disk spring 1020 is not necessarily a sealing element, so that the first volume 720 and second volume 740 shown in FIG. 4 can form a collective volume 1030. Spring elements other than disk spring 1020 can also be used in other embodiments. Therefore, depending on the embodiment, the collective volume 1030 can again be broken down into corresponding first volume 720 and second volume 740.

The disk spring 1020 can also be exchanged, for example, for a diaphragm spring, an arrangement of helical springs or another spring element. Disk spring 1020 or the spring element used instead of disk spring 1020 can also be pre-loaded in tension in other embodiments. Accordingly, this clutch arrangement 100 according to one embodiment can also be a normally closed clutch.

In this embodiment example, a connection component 1015 serves to provide the substantially rotationally fixed connection to conveying component 340, this connection component 1015 being mechanically connected via rivet connection 350 to the cover, i.e., second housing shell 130, to be fixed with respect to rotation relative to it. However, other connection techniques may also be used instead of this in other embodiments.

The connection component 1015 has a plurality of leaf springs 1010 which provide the substantially rotationally fixed connection to conveying component 340 in the manner already described in connection with FIG. 4. To this end, connection component 1015 or leaf springs 1010 thereof are connected mechanically via additional rivet connections 1000 to conveying component 340 to be fixed with respect to rotation relative to it. However, other connection techniques, e.g., such as those described in connection with FIG. 4 can also be used in this case.

The pressing element 620 in the clutch arrangement 100 shown in FIG. 7 is also constructed differently. While pressing element 620 again has a piston 610, it additionally comprises a contact disk spring 1040. The contact disk spring 1040 is configured in this instance as a substantially annular structure. It contacts inner plate 270, which is also first component 280 in this instance, at a region that is closer to the outer radial end of contact disk spring 1040, while it is supported at a shoulder 1050 of pressing element 620 at a radially inner region of contact disk spring 1040. This results in a distance or gap S2, not shown in FIG. 7, between contact disk spring 1040 in the region of shoulder 1050, i.e., a radially inner region, in relation to inner plate 270.

In this case, shoulder 1050 of pressing element 620 extends only over a small radial area adjoined radially outwardly by a collar structure 1060 at a pressing point 1070. Pressing point 1070 is frequently the point of collar structure 1060 closest to contact disk spring 1040. In the neutral position of pressing element 620, there is a distance or gap S2 between pressing point 1070 and contact disk spring 1040 along axial direction, i.e., along axis of rotation 300, which does not exceed gap S1. Further, pressing point 1070 has a distance from axis of rotation 300 perpendicular to the latter which is greater than the dimension of shoulder 1050 along radial direction but which does not exceed an outer diameter of contact disk spring 1040.

In other words, since gap S2 does not exceed gap S1 and might be smaller than gap S1, pressing element 620 contacts contact disk spring 1040 via pressing point 1070 substantially at the level of the friction radius. Accordingly, the location of the pressing pressure can be defined and fixed using a corresponding collar radius dimension. More accurately, pressing point 1070 is really a pressing line in view of the substantially rotational configuration of pressing element 620 and contact disk spring 1040.

If the pressing element 620 is now actuated so that it moves in the direction toward friction surfaces 230, 240, contact disk spring 1040 generates or strengthens the force exerted on inner plate 270. In so doing, due to the structure of contact disk spring 1040, a deformation of the latter is brought about so that the contact disk spring is slightly deformed and "rolls along" the inner plate 270. This may bring about a slight shift in the distance of the maximum force acting on inner plate 270. Due to the configuration of friction pack 180, the point of the maximum pressing force approximately corresponds to a radius at which the greatest pressing forces occur in the region of friction facings 260. For this reason, this radius is also referred to as friction radius.

If pressing element 620 is moved farther so that pressing point 1070 comes into contact with contact disk spring 1040, i.e., when gap S2 is bridged, the radial distance of the pressing point from axis of rotation 300 defines the position of the friction radius. In this way, the latter can be defined in a more deliberate manner, which may result in reduced wear, an irregular wear and/or an improved dissipation of heat by the fluid medium flowing through friction surfaces 230, 240. This increases the number of additional component parts only slightly compared with the embodiment of the pressing element 620 shown in FIGS. 1 and 4 because of the additional implementation of contact disk spring 1040.

Different geometries of the collar structure with pressing point 1070 can also be implemented in other embodiments. For example, instead of an individual pressing point 1070, a pressing surface with more than one pressing point 1070 can also be provided. Likewise, a diaphragm spring or a different spring element can also be used instead of contact disk spring 1040.

FIG. 7 further schematically shows the previously mentioned transmission input shaft 1080 with its external toothing 1090 which meshes with the internal toothing 210 and which makes possible the rotationally fixed connection to lower hub 200, i.e., output component 190. As has already been mentioned, external toothing 1090 is missing some teeth to allow the fluid medium to flow through to the inlet region 820.

Further, FIG. 7 shows a groove with a sealing element 1100 which extends in circumferential direction around transmission input shaft 1080 between inlet region 820 and inlet bore 650 of piston pressure space 590. This groove contacts front hub 580 and seals off inlet region 820 from inlet bore 650. Transmission input shaft 1080 further has an inlet channel 1110 which is oriented symmetrically and along axis of rotation 300 so that inlet bore 650 and, therefore, piston pressure space 590 can be supplied with fluid medium. Inlet channel 1110 can be supplied with fluid medium for filling piston pressure space 590 via a connection bore 1120.

FIG. 8 shows one embodiment of a clutch arrangement 100 according to one embodiment in which an additional spacer disk 900' is integrated in addition to the spacer disk 900 which has already been shown. The further spacer disk 900' can likewise be implemented in one or more parts as has already been described. Spacer disk 900' is arranged between dividing wall 570 and pressing element 620 in the region of piston pressure space 590. Accordingly, the plate clearance S can also be varied by varying the position of pressing element 620. Accordingly, together with spacer disk 900, the plate clearance S can be varied by varying the spacing of second housing shell 130 or by varying the spacing of pressing element 620.

It is certainly not necessary to implement both spacer disks 900, 900' simultaneously. A corresponding adjustment of plate clearance S can be realized already in implementing an individual spacer disk 900 or both spacer disks 900 without increasing the installation space needed for clutch arrangement 100. On the contrary, the use of an individual spacer disk 900 or 900' and the use of both spacer disks 900, 900' makes it possible to adjust plate clearance S and, in so doing, at the same time to reduce the necessary axial installation space for clutch arrangement 100 compared to conventional solutions.

Otherwise, the embodiment of a clutch arrangement 100 shown in FIG. 8 does not differ from that shown in FIG. 7, and reference is had to the description of FIG. 7 in this respect.

Finally, FIG. 9 shows a further variation of the clutch arrangement 100 shown in FIG. 7 which essentially differs from the latter in that recess 930 is not provided. Consequently, support 390 is shorter in axial direction so that portion 370 with the further driver surface 320 of outer plate 250, which again represents second component 290, is angled, i.e., bent by a predefined angle away from second housing shell 130 relative to axis of rotation 300.

Apart from this variation, the clutch arrangement 100 from FIG. 9 also does not differ from the clutch arrangement 100 shown in FIG. 7.

Accordingly, embodiments of a clutch arrangement 100 allow a driving of plates while simultaneously providing a vane function for a fluid medium which can be located in housing 110 of clutch arrangement 100.

Clutch arrangements 100 can accordingly be provided for different clutch applications, for example, for vehicles with an automatic transmission which is installed in the front area of the vehicle and constructed transverse to the driving direction.

Clutch arrangements 100 according to one embodiment may be used as starting clutches, but also as separating clutches in connection with synchronized transmissions or in connection with longitudinally installed engines. Oil may serve as fluid medium, for example.

The embodiments described in the preceding paragraphs merely serve as an illustration of the principles of the present invention. It will be appreciated that modifications and variations of the arrangements and details described herein will be apparent to those skilled in the art. Therefore, it is intended that the invention be limited only by the protective scope of the appended patent claims and not by the specific details set forth herein in the description and explanation of the embodiments.

The invention claimed is:

1. A clutch arrangement for a drivetrain of a vehicle, comprising:
  an at least partially disk-shaped first component part formed by an inner plate having a first friction surface;
  an at least partially disk-shaped second component part having a second friction surface, wherein the first friction surface and the second friction surface are configured and arranged to be brought into a frictional engagement with each other and contact a fluid medium in operation; and
  a conveying component comprising a conveying surface for the fluid medium and coupled to a drive component to be substantially fixed with respect to rotation relative to the drive component such that the conveying surface causes a flow of the fluid medium during a rotation relative to the fluid medium, the inner plate disposed radially outward of the conveying component;
  a piston constructed to form a pressing element configured and arranged to bring the first friction surface and the second friction surface in frictional engagement with each other;
  an input shaft;
  wherein the inner plate comprises a portion having a driver surface at a lateral face, the inner plate engaging with the conveying surface of the conveying component via the driver surface so that, when the conveying component rotates, the respective inner plate is also set in rotation for transferring a torque from the drive component to the inner plates; and
  wherein the conveying component is annular;
  wherein the pressing element has a starting position and is configured and arranged radially outward of the input shaft and to bring the first friction surface and the second friction surface into frictional engagement with each other and to sever the frictional engagement when actuated, wherein the pressing element has a passage extending through the pressing element into a first volume for the fluid medium, said passage being located at a same radial distance to an axis of rotation as a radial distance from the conveying surface to the axis of rotation, and wherein fluid medium can flow through at least one of the first and second component parts and a support in an operating condition in which frictional engagement is present, so that during a rotation of the conveying surface relative to the fluid medium, a flow of fluid medium radially outward through or along at least one of the first friction surface and the second friction surface is brought about by the conveying surface;
  wherein the drive component is a housing of the clutch arrangement configured to be filled with the fluid medium, and wherein the conveying component is connected to the housing of the clutch arrangement so as to be fixed with respect to rotation relative to the housing of the clutch arrangement; and
  additionally comprising a sealing element arranged and constructed for separating the first volume for the fluid medium from a second volume for the fluid medium and for exerting a force on the pressing element so as to return the pressing element back to the starting position when the pressing element is not actuated.

2. The clutch arrangement of claim 1, wherein the first component part engages with the conveying component via the driver surface such that a contacting surface between the driver surface and the conveying surface is at most 50% of a surface area of the conveying surface.

3. The clutch arrangement of claim 1, wherein the conveying surface is contiguous and flat.

4. The clutch arrangement of claim 1, wherein the conveying surface is oriented substantially perpendicular to a tangential direction, said tangential direction being perpendicular to an axis of rotation of the first component part and a radial direction facing away perpendicularly from the axis of rotation.

5. The clutch arrangement of claim 1, wherein the first component part comprises a disk-shaped component part with a central recess, wherein the first friction surface is arranged at a main surface of the disk-shaped component part oriented substantially perpendicular to an axis of rotation of the first component part, wherein the engagement with the conveying component takes place at the lateral surface of the portion of the disk-shaped component part projecting into the central recess, wherein the second component part comprises an additional disk-shaped component part with a central recess, and wherein the additional disk-shaped component part engages at an outer radius thereof with the support.

6. The clutch arrangement of claim 5, wherein the pressing element is configured and arranged to bring the first friction surface and the second friction surface into frictional engagement with each other and/or to sever the frictional engagement when actuated, wherein the pressing element at least partially limits the first volume that is filled with fluid medium and comprises, when viewed in a cross-sectional plane in which an axis of rotation extends, a cross-sectional area which corresponds to at most twenty times the cross-sectional area of the conveying surface.

7. The clutch arrangement of claim 1, wherein the sealing element is connected to the housing of the clutch arrangement and to the conveying component.

8. The clutch arrangement of claim 1, wherein the sealing element is connected to the housing of the clutch arrangement and the piston.

9. The clutch arrangement of claim 1, wherein the conveying component comprises a ring segment-shaped portion having a plurality of teeth arranged at regular, equally spaced intervals, each one of the plurality of teeth having two axially extending opposed conveying surfaces connected by a top surface.

10. A clutch arrangement for a drivetrain of a vehicle, comprising:
   an at least partially disk-shaped first component part formed by an inner plate having a first friction surface;
   an at least partially disk-shaped second component part having a second friction surface, wherein the first friction surface and the second friction surface are configured and arranged to be brought into a frictional engagement with each other and contact a fluid medium in operation; and
   a conveying component comprising a conveying surface for the fluid medium and coupled to a drive component to be substantially fixed with respect to rotation relative to the drive component such that the conveying surface causes a flow of the fluid medium during a rotation relative to the fluid medium, the inner plate disposed radially outward of the conveying component;
   a piston constructed to form a pressing element configured and arranged to bring the first friction surface and the second friction surface in frictional engagement with each other;
   an input shaft;
   wherein the inner plate comprises a portion having a driver surface at a lateral face, the inner plate engaging with the conveying surface of the conveying component via the driver surface so that, when the conveying component rotates, the respective inner plate is also set in rotation for transferring a torque from the drive component to the inner plates; and
   wherein the conveying component is annular;
   wherein the pressing element has a starting position and is configured and arranged radially outward of the input shaft and to bring the first friction surface and the second friction surface into frictional engagement with each other and to sever the frictional engagement when actuated, wherein the pressing element has a passage extending through the pressing element into a first volume for the fluid medium, said passage being arranged on the level of the conveying surface; and
   wherein fluid medium can flow through at least one of the first and second component parts and a support in an operating condition in which frictional engagement is present, so that during a rotation of the conveying surface relative to the fluid medium, a flow of fluid medium radially outward through or along at least one of the first friction surface and the second friction surface is brought about by the conveying surface;
   wherein the drive component is a housing of the clutch arrangement configured to be filled with the fluid medium, and wherein the conveying component is connected to the housing of the clutch arrangement so as to be fixed with respect to rotation relative to the housing of the clutch arrangement; and
   additionally comprising a sealing element arranged and constructed for separating the first volume for the fluid medium from a second volume for the fluid medium and for exerting a force on the pressing element so as to return the pressing element back to the starting position when the pressing element is not actuated.

* * * * *